United States Patent
Nara et al.

(10) Patent No.: US 8,924,145 B2
(45) Date of Patent: Dec. 30, 2014

(54) WEB BULLETIN BOARD SYSTEM, TRAVEL PLANNING ASSIST METHOD AND CENTER SERVER

(75) Inventors: Norikazu Nara, Chiba (JP); Noriyuki Abe, Kanagawa (JP); Kimio Okamoto, Kanagawa (JP); Takashi Shioya, Tokyo (JP); Hiroaki Takatsuki, Tokyo (JP); Takaaki Ishii, Kanagawa (JP)

(73) Assignee: Clarion Co., Ltd., Tokyo (JP)

( * ) Notice: Subject to any disclaimer, the term of this patent is extended or adjusted under 35 U.S.C. 154(b) by 368 days.

(21) Appl. No.: 13/388,155

(22) PCT Filed: Jul. 28, 2010

(86) PCT No.: PCT/JP2010/062661
§ 371 (c)(1),
(2), (4) Date: Apr. 13, 2012

(87) PCT Pub. No.: WO2011/013688
PCT Pub. Date: Feb. 3, 2011

(65) Prior Publication Data
US 2012/0191341 A1  Jul. 26, 2012

(30) Foreign Application Priority Data

Jul. 31, 2009  (JP) ................. 2009-179147

(51) Int. Cl.
| | | |
|---|---|---|
| G01C 21/34 | (2006.01) | |
| G06F 15/16 | (2006.01) | |
| H04W 4/12 | (2009.01) | |
| G01C 21/36 | (2006.01) | |
| G09B 29/10 | (2006.01) | |
| G06Q 50/14 | (2012.01) | |
| G06Q 10/10 | (2012.01) | |
| G06Q 50/30 | (2012.01) | |
| G08G 1/0968 | (2006.01) | |

(52) U.S. Cl.
CPC .......... *G01C 21/36* (2013.01); *G08G 1/096883* (2013.01); *G09B 29/106* (2013.01); *G01C 21/3611* (2013.01); *G01C 21/362* (2013.01); *G06Q 50/14* (2013.01); *G06Q 10/101* (2013.01); *G01C 21/3438* (2013.01); *G06Q 50/30* (2013.01)
USPC ........... 701/420; 701/532; 701/533; 701/537; 701/538; 701/24; 340/995.1; 340/995.19; 340/539.11; 340/539.13

(58) Field of Classification Search
CPC .......................... G01C 21/361; G01C 21/3611
See application file for complete search history.

(56) References Cited

U.S. PATENT DOCUMENTS 7,085,629 B1 * 8/2006 Gotou et al. ............... 701/1
8,014,942 B2 * 9/2011 Moinzadeh et al. ......... 701/420

(Continued)

FOREIGN PATENT DOCUMENTS

| JP | 11-143358 A | 5/1999 |
|---|---|---|
| JP | 2002-048558 A | 2/2002 |

(Continued)

OTHER PUBLICATIONS

Extended Supplementary European Search Report dated Aug. 26, 2013, from related European Application No. 10 80 4434.8.

(Continued)

*Primary Examiner* — Calvin Cheung
*Assistant Examiner* — Kevin P Mahne
(74) *Attorney, Agent, or Firm* — Scully, Scott, Murphy & Presser, P.C.

(57) ABSTRACT

Provided is a Web bulletin board system (10) capable of lessening the burden in forming a travel plan when a group of people plan a trip. This Web bulletin board system (10) comprises a center server (20) which deems character strings indicated by predetermined symbols in messages in a chat to be destinations and automatically generates a list of destinations.

13 Claims, 28 Drawing Sheets

(56) References Cited

U.S. PATENT DOCUMENTS

| | | |
|---|---|---|
| 2002/0049529 A1 | 4/2002 | Ikeda |
| 2003/0182052 A1* | 9/2003 | DeLorme et al. ............. 701/201 |
| 2007/0055442 A1* | 3/2007 | Kawakami et al. .......... 701/208 |
| 2007/0255493 A1* | 11/2007 | Ayoub et al. ................. 701/211 |
| 2007/0299600 A1* | 12/2007 | Liberto et al. ............... 701/201 |
| 2008/0033636 A1* | 2/2008 | Ryu et al. .................... 701/201 |
| 2008/0036586 A1 | 2/2008 | Ohki |
| 2009/0182498 A1 | 7/2009 | Seymour |
| 2010/0070896 A1* | 3/2010 | Attinger ....................... 715/765 |

FOREIGN PATENT DOCUMENTS

| | | |
|---|---|---|
| JP | 2004-157692 A | 6/2004 |
| JP | 2004-163179 A | 6/2004 |
| JP | 2005-107786 A | 4/2005 |
| JP | 2007-255908 A | 10/2007 |

OTHER PUBLICATIONS

International Search Report dated Sep. 7, 2010 issued in PCT/JP2010/062661.

* cited by examiner

Web BULLETIN BOARD SYSTEM 10

FIG. 4

LINK TABLE 330

| MESH ID | M001 | |
|---|---|---|
| LINK DATA | LINK ID | L1 |
| | START NODE COORDINATE | (*, *) |
| | END NODE COORDINATE | (*, *) |
| | ROAD TYPE | ORDINARY ROAD |
| | LINK LENGTH | 300m |
| | START CONNECTION LINK | L7 |
| | END CONNECTION LINK | L2, L5 |
| | NAME | NATIONAL ROAD A |
| | ⋮ | ⋮ |
| LINK DATA | ⋮ | ⋮ |
| | ⋮ | ⋮ |

FIG. 18

POSITIONAL INFORMATION STORAGE 200

| NAVIGATION ID (2000) | POSITIONAL INFORMATION (2001) | ADDRESS (2002) | UPDATE DATE AND TIME (2003) |
|---|---|---|---|
| N001 | (*, *) | * * * * * | 2009/8/1 9:12:34 |
| N002 | (*, *) | * * * * * | 2009/7/31 13:57:43 |
| ⋮ | ⋮ | ⋮ | ⋮ |

FIG. 19

DESTINATION POINT INFORMATION STORAGE 201

Tabs (2010): N001 / N002 / ...  (2011)

| CHARACTER STRING (2012) | POSITIONAL INFORMATION (2013) | MEETING PLACE FLAG (2014) |
|---|---|---|
| * * * | (*, *) | 1 |
| * * * | (*, *) | 0 |
| ⋮ | ⋮ | ⋮ |

FIG. 20

POINT INFORMATION TABLE 2020

| CHARACTER STRING (2021) | POSITIONAL INFORMATION (2022) | FACILITY NAME (2023) |
|---|---|---|
| *、*、***、… | (*, *) | YY STATION |
| *、*、***、… | (*, *) | XX TOWER |
| ⋮ | ⋮ | ⋮ |

FIG. 21

ID INFORMATION STORAGE 203

N001 (2030), N002, …

| USER ID (2032) | PASSWORD (2033) | STATUS (2034) | ADDRESS (2035) |
|---|---|---|---|
| U001 | **** | 1 | **** |
| U002 | **** | 0 | — |
| ⋮ | ⋮ | ⋮ | ⋮ |

ROUTE INFORMATION STORAGE 204

| 2040 | | 2041 |
|---|---|---|
| N001 \ N002 \ ... | | |

| DESTINATION POINT | (*, *) | 9:00 |
|---|---|---|
| LINK ID | L500 | — |
| ⋮ | ⋮ | ⋮ |
| LINK ID | L451 | — |
| VIA-POINT | (*, *) | 7:46 |
| LINK ID | L345 | — |
| ⋮ | ⋮ | ⋮ |
| LINK ID | L003 | — |
| VIA-POINT | (*, *) | 7:30 |
| LINK ID | L261 | — |
| ⋮ | ⋮ | ⋮ |
| LINK ID | L107 | — |
| DEPARTURE POINT | (*, *) | 7:00 |

FIG. 24
SYMBOL INFORMATION STORAGE 212
| SYMBOL ID 2120 | SYMBOL 2121 | MEANING 2122 |
|---|---|---|
| C001 |  | DESTINATION POINT |
| C002 |  | DEPARTURE TIME |
| C003 | 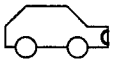 | CONTROL COMMAND |
| C004 | 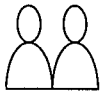 | MEETING PLACE |
| ⋮ | ⋮ | ⋮ |

COMMAND INFORMATION STORAGE 213

WEB BULLETIN BOARD SYSTEM, TRAVEL PLANNING ASSIST METHOD AND CENTER SERVER

TECHNICAL FIELD

The present invention relates to a technique for assisting a travel planning prepared by more than one person. This application claims priority to Japanese Patent Application No. 2009-179147 filed on Jul. 31, 2009, and in the designated countries where incorporation of documents by reference is approved, the content described in the specification of the aforementioned patent application is incorporated into the present patent application by reference.

BACKGROUND ART

Patent Document 1 described below discloses a travel assisting system which registers from a user terminal, information such as a destination point, an arrival time, and a via-point, in a travel assist server via a network, thereby allowing the travel assist server to make a search for a guidance route, and when a navigation device is activated, the guidance route being retrieved is transmitted to the navigation device, thereby achieving a setting of information such as the destination point and the guidance route in the navigation device, without directly manipulating the navigation device.

PRIOR ART DOCUMENT

Patent Document

Patent Document 1: Japanese Unexamined Patent Application Publication No. 11-143358

DISCLOSURE OF THE INVENTION

Problem to be Solved by the Invention

In the meantime, when more than one person makes a travel plan, in some cases, multiple persons have a discussion on a chat line or the like, to determine the travel plan. When a destination point, a via-point, and the like, are finally determined, any one of the persons intending to go traveling is required to set those information items in the navigation device. However, in the case where there are multiple via-points, it may take time to configure the settings for the navigation device in certain instances.

Sometimes, it is not possible to know the time when the via-point is passed until a route is actually drawn, and it may be necessary to receive approval again from other person intending to go traveling, after drawing the route in the navigation device, in order to ultimately determine the travel plan. The technique described in the aforementioned Patent Document 1 allows setting information such as the destination point and the guidance route in the navigation device, without direct manipulation of the navigation device, but it does not reduce a burden in travel planning which is prepared by more than one person.

The present invention has been made considering the situation above, and an object of the present invention is to reduce the burden in making a travel plan according to more than one person.

Means to Solve the Problem

In order to solve the problem above, a first aspect of the present invention provides, for example, a Web bulletin board system, having a navigation device, multiple user terminals, and a center server for communicating with the navigation device and the multiple user terminals via a communication network, wherein, the center server includes, a positional information storage for storing information indicating a current position of the navigation device, a symbol information storage for storing a symbol representing a destination point, a map database for storing positional information of a point in association with a character string indicating the point, a destination point information storage for storing the positional information of the point indicated by the character string, together with the character string being associated, in ascending order of distance from the current position of the navigation device, a positional information updater for updating the information in the positional information storage, to information indicating the current position of the navigation device being received, upon receipt from the navigation device, of the information indicating the current position thereof, a chat service part for managing an ID of a user logging in a chat, and upon receipt of a message from a user terminal used by the user logging in the chat, transmitting the message being received to the user terminal of the user logging in the chat, a symbol processor for extracting from the map database, the positional information of the point associated with the character string designated by the symbol, when the symbol representing the destination point exists in the message that the chat service part received from the user terminal, and a destination point information updater for additionally storing in the destination point information storage, the character string and the positional information extracted by the symbol processor, sorting the character strings in the destination point information storage in ascending order of distance of the associated positional information from the current position of the navigation device, and transmitting to the user terminal of the user logging in the chat, the character strings being sorted, respectively in association with numbers in ascending order of distance from the current position of the navigation device, the user terminal includes, a chat client part for transmitting to the center server, a message inputted according to a manipulation by the user, and displaying the message transmitted from the center server, and a destination point information display part for displaying the character strings transmitted from the center server, being sorted in ascending order of distance from the current position of the navigation device, and the navigation device includes, a current position calculation part for calculating the current position of the navigation device, and a current position transmitter for transmitting to the center server, the current position calculated by the current position calculation part at a predetermined timing.

A second aspect of the present invention provides a travel planning assist method in a Web bulletin board system having a navigation device, multiple user terminals, and a center server for communicating with the navigation device and the multiple user terminals via a communication network, wherein, the center server executes a positional information updating step for updating information indicating a current position of the navigation device stored in a positional information storage, to information being received indicating the current position of the navigation device, upon receipt from the navigation device, of the information indicating the current position thereof, a chat service step for managing an ID of a user logging in a chat, and upon receipt of a message from a user terminal used by the user logging in the chat, transmitting the message being received to the user terminal of the user logging in the chat, a symbol processing step for extracting from a map database, the positional information of a point associated with a character string designated by a symbol, when the symbol representing a destination point exists in the message received from the user terminal in the chat service step, the map database storing the positional information of the point in association with the character string indicating the point, and a destination point information updating step for additionally storing in a destination point information storage for storing the positional information of the point indicated by the character string together with the character string being associated, the character string and the positional information extracted in the symbol processing step, sorting the character strings in the destination point information storage in ascending order of distance of the associated positional information from the current position of the navigation device, and transmitting to the user terminal of the user logging in the chat, the character strings being sorted, respectively in association with numbers in ascending order of distance from the current position of the navigation device, the user terminal executes a chat client step for transmitting to the center server, a message inputted according to a manipulation by the user, and displaying the message transmitted from the center server, and a destination point information display step for displaying the character strings transmitted from the center server, being sorted in ascending order of distance from the current position of the navigation device, and the navigation device executes a current position calculating step for calculating the current position of the navigation device, and a current position transmitting step for transmitting to the center server, the current position calculated in the current position calculating step at a predetermined timing.

A third aspect of the present invention provides a center server for communicating with a navigation device and multiple user terminals via a communication network, the center server including, a positional information storage for storing information indicating a current position of the navigation device, a symbol information storage for storing a symbol representing a destination point, a map database for storing positional information of a point, in association with a character string indicating the point, a destination point information storage for storing the positional information of the point indicated by the character string, together with the character string being associated, in ascending order of distance from the current position of the navigation device, a positional information updater for updating the information in the positional information storage, to information indicating the current position of the navigation device being received, upon receipt from the navigation device, of the information indicating the current position thereof, a chat service part for managing an ID of a user logging in a chat, and upon receipt of a message from a user terminal used by the user logging in the chat, transmitting the message being received to the user terminal of the user logging in the chat, a symbol processor for extracting from the map database, the positional information of the point associated with the character string designated by the symbol, when the symbol representing the destination point exists in the message that the chat service part received from the user terminal, and a destination point information updater for additionally storing in the destination point information storage, the character string and the positional information extracted by the symbol processor, sorting the character strings in the destination point information storage in ascending order of distance of the associated positional information from the current position of the navigation device, and transmitting to the user terminal of the user logging in the chat, the character strings being sorted, respectively in association with numbers in ascending order of distance from the current position of the navigation device.

Effect of the Invention

According to the present invention, it is possible to reduce a burden of travel planning, when more than one person prepares a travel plan.

BRIEF DESCRIPTION OF DRAWINGS

FIG. 4 is a conceptual diagram showing one example of a data structure of a link table 330 stored in a link data storage 33;

FIG. 18 conceptually illustrates one example of data structure stored in a positional information storage 200;

FIG. 19 conceptually illustrates one example of data structure stored in a destination point information storage 201;

FIG. 20 conceptually illustrates one example of data structure of a point information table 2020 stored in a map DB 202;

FIG. 21 conceptually illustrates one example of data structure stored in an ID information storage 203;

FIG. 22 conceptually illustrates one example of data structure stored in a route information storage 204;

FIG. 24 conceptually illustrates one example of data structure stored in a symbol information storage 212;

DESCRIPTION OF EMBODIMENTS

Figure 1:
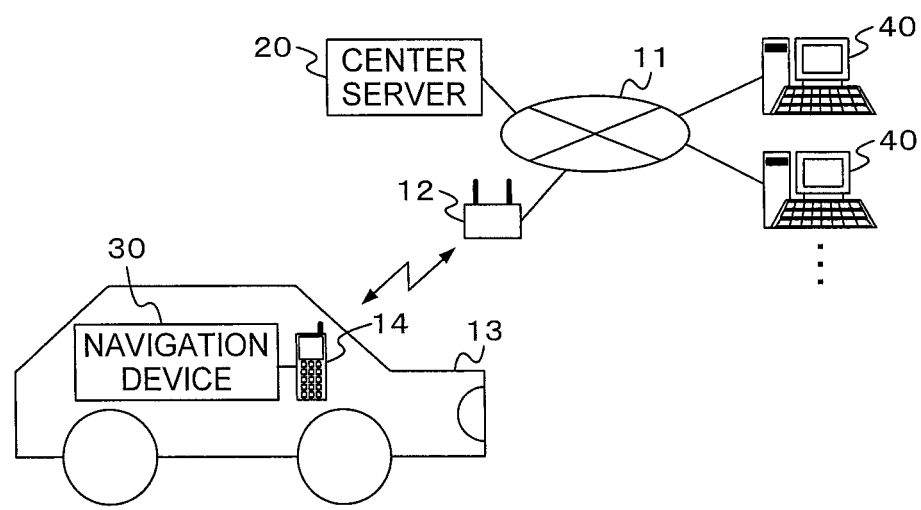
FIG. 1 is a system block diagram showing a configuration of a Web bulletin board system 10 relating one embodiment of the present invention.

A preferred embodiment of the present invention will be explained hereinafter, with reference to the accompanying drawings;

FIG. 1 is a system block diagram showing a configuration of a Web bulletin board system 10 relating one embodiment of the present invention. The Web bulletin board system 10 is provided with a center server 20, a navigation device 30, and user terminals 40. The center server 20 and the navigation device 30 are connected to a communication line 11, and they are communicated with each other via the communication line 11.

The navigation device 30 is mounted on a vehicle 13 and connected to a communication unit 14. The communication unit 14 establishes communication with a nearest base station 12 according to a wireless transmission method, such as WCDMA (Wideband-Code Division Multiple Access) and PHS (Personal Handyphone System). The navigation device 30 sends and receives data, by communicating with the center server 20, via the communication unit 14 and the base station 12.

Figure 2:
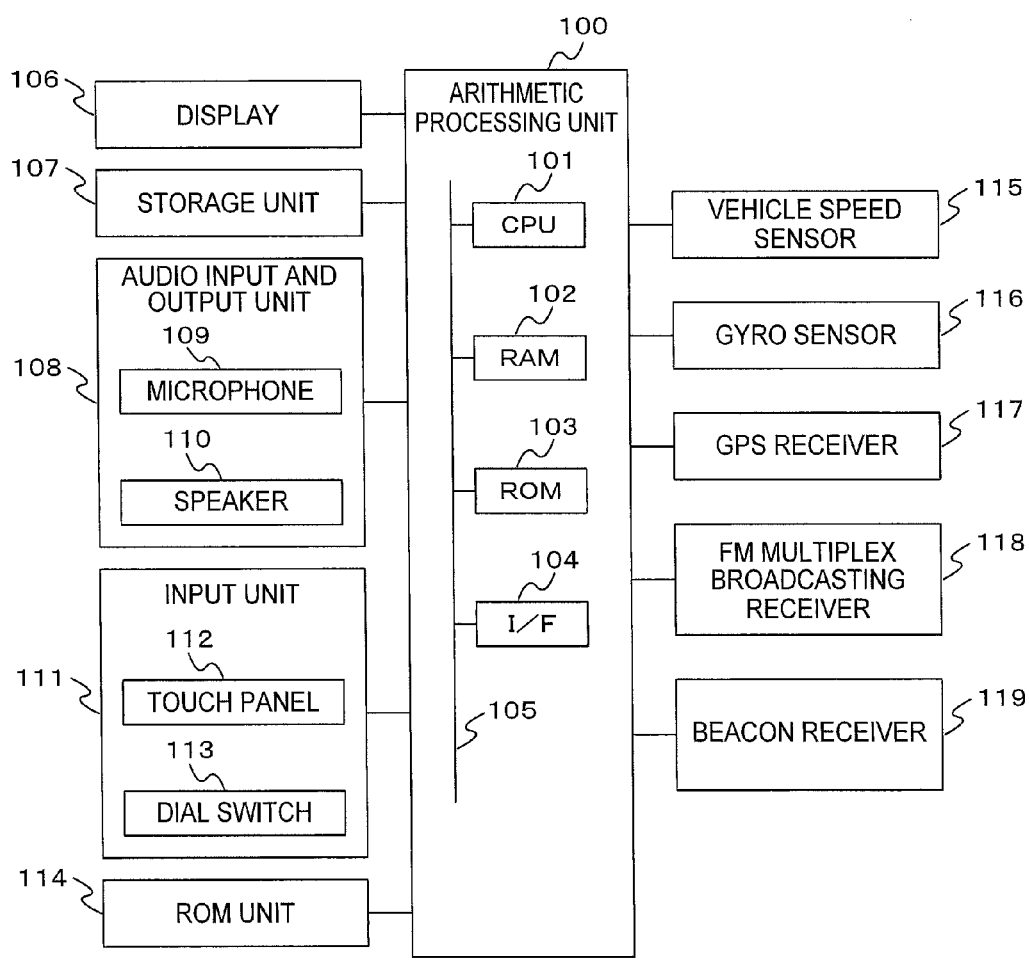
FIG. 2 is a hardware block diagram showing one example of configuration of a navigation device 30.

FIG. 2 is a hardware block diagram showing one example of configuration of the navigation device 30. The navigation device 30 incorporates an arithmetic processing unit 100, a storage unit 107, an audio input and output unit 108, an input unit 111, an ROM unit 114, a vehicle speed sensor 115, a gyro sensor 116, a GPS (Global Positioning System) receiver 117, an FM multiplex broadcasting receiver 118, and a beacon receiver 119.

The arithmetic processing unit 100 is a main unit for performing various processing. By way of example, the arithmetic processing unit 100 detects a current position of the navigation device 30, based on information outputted from various sensors (the vehicle speed sensor 115 and the gyro sensor 116), the GPS receiver 117, the FM multiplex broadcasting receiver 118, and the like. On the basis of the current positional information being obtained, the arithmetic processing unit 100 reads out from the storage unit 107 or from the ROM unit 114, map data necessary to create a display.

The arithmetic processing unit 100 graphically expands the map data being read out, and displays a mark indicating the current position on the display 106 in such a manner as superimposing thereon. The arithmetic processing unit 100 uses the map data, and the like, stored in the storage unit 107 or in the ROM unit 114 to search for an optimum route (recommended route) connecting a departure place (or a current position) with a destination designated by the user. It further uses the speaker 110 and the display 106 to guide the user.

The arithmetic processing unit 100 of the navigation device 30 has a configuration that connects each device via a bus 105. The arithmetic processing unit 100 incorporates a CPU (Central Processing Unit) 101 for executing various processes such as numerical processing and control of each device, RAM (Random Access Memory) 102 for storing map data, operation data, and the like, read out from the storage unit 107, ROM (Read Only Memory) 103 for storing programs and data, and an I/F (interface) 104 for establishing connection between various hardware and the arithmetic processing unit 100.

The display 106 is a unit for displaying the graphics information generated by the arithmetic processing unit 100, and the like. The display 106 is made up of a liquid crystal display, an organic EL (Electro-Luminescence) display, or the like. The storage unit 107 is made up of a storage medium at least readable and writable, such as an HDD (Hard Disk Drive) and a non-volatile memory card. This storage medium stores a link table, and the like, being the map data (including link data of links constituting roads on a map) which is necessary for a typical route searching apparatus.

The audio input and output unit 108 is provided with a microphone 109 and the speaker 110. The microphone 109 captures sounds made by a passenger such as a driver. The speaker 110 outputs a message to the user in the form of an audio signal, generated by the arithmetic processing unit 100. The microphone 109 and the speaker 110 are separately mounted on predetermined portions of the vehicle 13. It is to be noted that an enclosure may accommodate these elements in an integrated manner. The navigation device 30 may be provided with multiple microphones 109 and multiple speakers 110, respectively.

The input unit 111 is a unit for accepting an instruction from the user, via a manipulation by the user. The input unit 111 is made up of a touch panel 112, a dial switch 113, and other hard switches (not illustrated).

The touch panel 112 is mounted on a display screen side of the display 106, being a transparent to make the display screen visible. The touch panel 112 is used to specify a touch position in association with XY coordinates of the image displayed on the display 106, convert the touch position to coordinates, and output the coordinates. The touch panel 112 is made up of pressure-sensitive type or electrostatic type input detecting elements, or the like.

The dial switch 113 is constructed in rotatable manner, both in the clockwise direction and in the anti-clockwise direction, issues a pulse signal according to a rotation by a predetermined angle, and outputs the pulse signal to the arithmetic processing unit 100. The arithmetic processing unit 100 obtains a rotation angle based on the number of the pulse signals.

The ROM unit 114 is made up of a storage medium, at least readable, such as an ROM (Read Only Memory) including a CD-ROM, a DVD-ROM, and the like, and an IC (Integrated Circuit) card. This storage medium stores video data, audio data, and the like, for instance.

The vehicle speed sensor 115, the gyro sensor 116, and the GPS receiver 117 are used to detect a current position by the navigation device 30. The vehicle speed sensor 115 is a sensor for outputting a value that is used to calculate a vehicle speed. The gyro sensor 116 is made up of an optical fiber gyroscope, a vibrating gyroscope, or the like, to detect an angular rate according to a rotation of a moving object.

The GPS receiver 117 receives a signal from a GPS satellite, measures a distance between the moving object and the GPS satellite, and a rate of change of the distance, with respect to at least three satellites, thereby obtaining the current position, a travelling speed, and traveling azimuth of the moving object.

The FM multiplex broadcasting receiver 118 receives an FM multiplex broadcasting signal that is transmitted from an FM multiplex broadcasting station. The FM multiplex broadcasting information includes brief current traffic information, information on restrictions, SA/PA (service area/parking area) information, parking lot information, weather information, and the like, according to the VICS (Vehicle Information Communication System: registered trademark), and character information and the like, provided by a radio station as FM multiplex general information.

The beacon receiver 119 receives the VICS information and the like, including brief current traffic information, information on restrictions, SA/PA (service area/parking area) information, parking lot information, weather information, emergency alert, and the like. By way of example, it is a unit to receive an optical beacon for optical communication, a radio beacon for radio communication, or the like.

Figure 3:
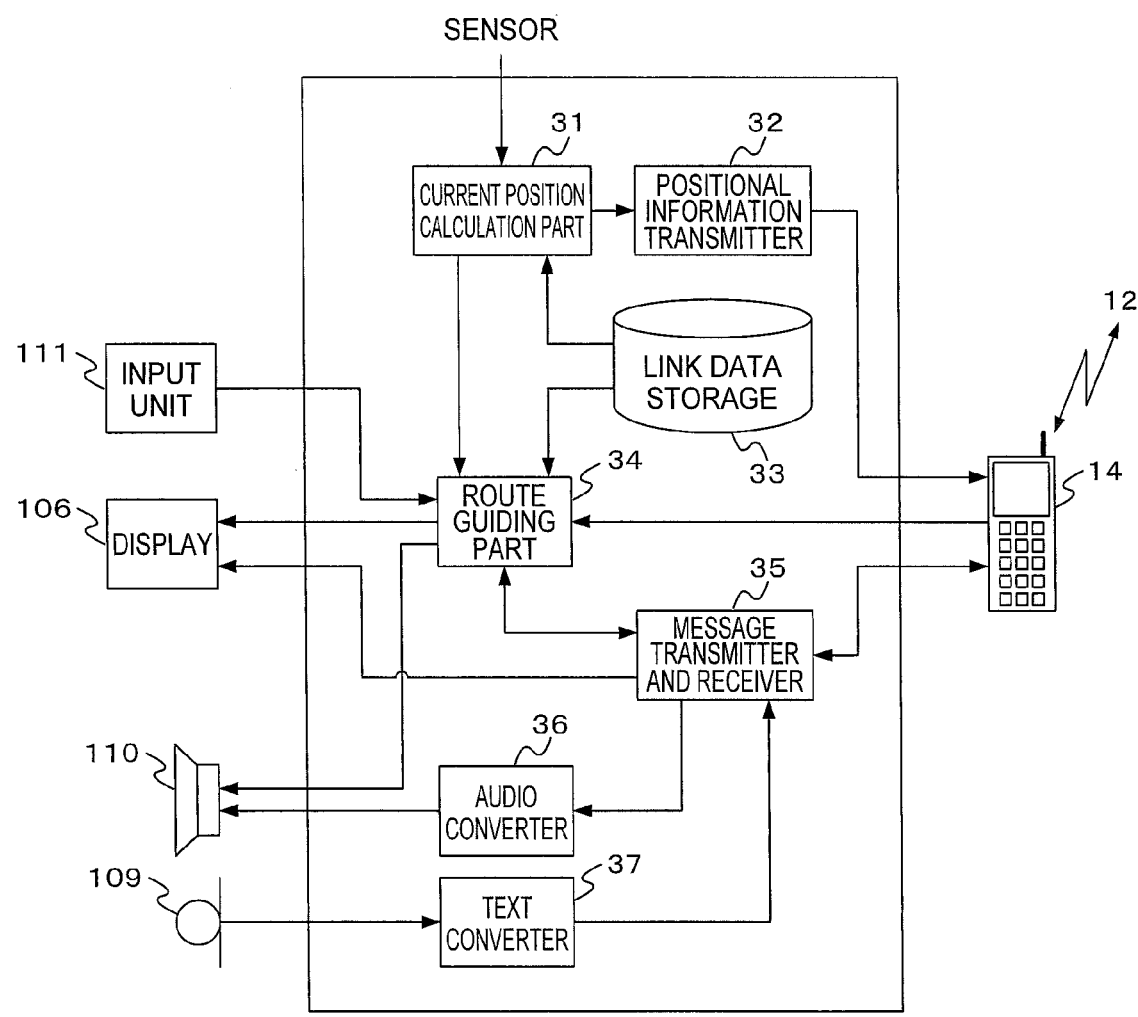
FIG. 3 is a block diagram showing one example of functional configuration of the navigation device 30.

FIG. 3 is a block diagram showing one example of a functional configuration of the navigation device 30. The navigation device 30 incorporates a current position calculation part 31, a positional information transmitter 32, a link data storage 33, a route guiding part 34, a message transmitter and receiver 35, an audio converter 36, and a text converter 37.

The link data storage 33 stores, a link table for storing information relating to links representing roads, map data, and the like. As shown in FIG. 4, for example, the link table 330 stores data relating to links, in the form of mesh data 331 with respect to each predetermined map area. Each item of the mesh data 331 includes following elements, such as a mesh ID 332 for identifying each mesh, and link data 333 being the data relating to the links within the mesh.

Each item of the link data 333 stores in advance a link ID 334 for identifying each link, a start node coordinate 335 of the link, an end node coordinate 336 of the link, a road type 337 of the link, a link length 338, a start connection link 339 being identification information of other link connected to the start node of the link, an end connection link 340 being identification information of other link connected to the end node of the link, a name of the road 341 associated with the link, and the like.

The current position calculation part 31 refers to the information within the link data storage 33 at a predetermined timing, based on the vehicle speed sensor 115, the gyro sensor 116, the GPS receiver 117, and the like, calculates the current position of the navigation device 30, and passes the current position thus calculated to the positional information transmitter 32 and the route guiding part 34. The positional information transmitter 32 transmits the current positional information received from the current position calculation part 31 to the center server 20 via the communication unit 14.

Figure 5:
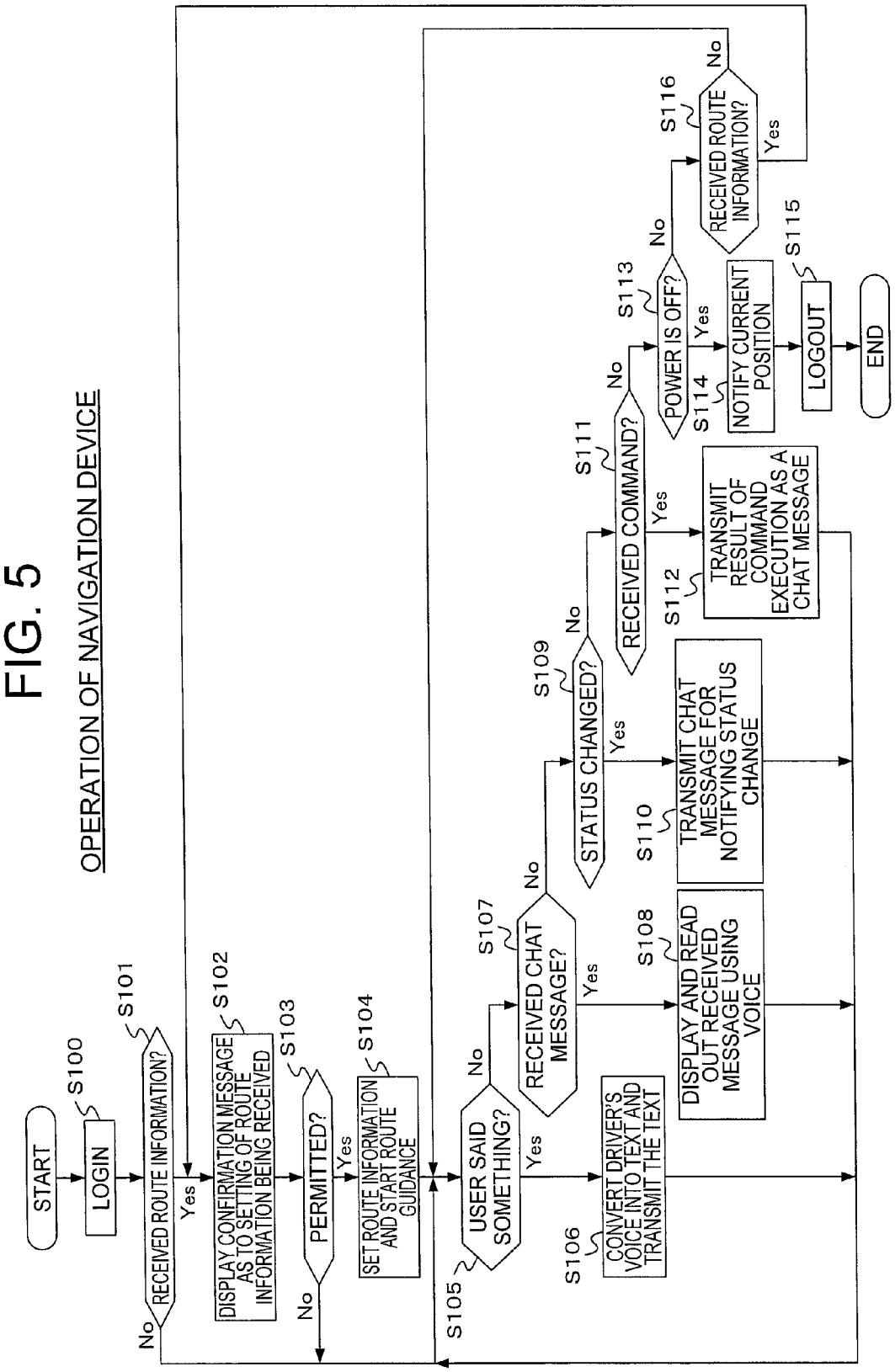
FIG. 5 is a flowchart showing one example of operation of the navigation device 30.

Next, with reference to the flowchart as shown in FIG. 5, an explanation will be made as to the processing of the route guiding part 34, the message transmitter and receiver 35, the audio converter 36, and the text converter 37. By way of example, power activation triggers the navigation device 30 to start the operation indicated by the flowchart.

Firstly, the message transmitter and receiver 35 logs in a chat service of the center server 20 via the communication unit 14 (S100). The message transmitter and receiver 35 uses for the login, an ID of a user who uses the navigation device 30, as well as an ID of the navigation device 30. Here in the present embodiment, a chat bulletin board is provided with respect to each navigation device 30, and the ID of the navigation device 30 is used to identify which bulletin board is logged in or to which bulletin board posting is performed. Therefore, when the user ID is used for the login, the message transmitter and receiver 35 informs the center server 20 of the ID of the navigation device 30 as well.

Figure 6:
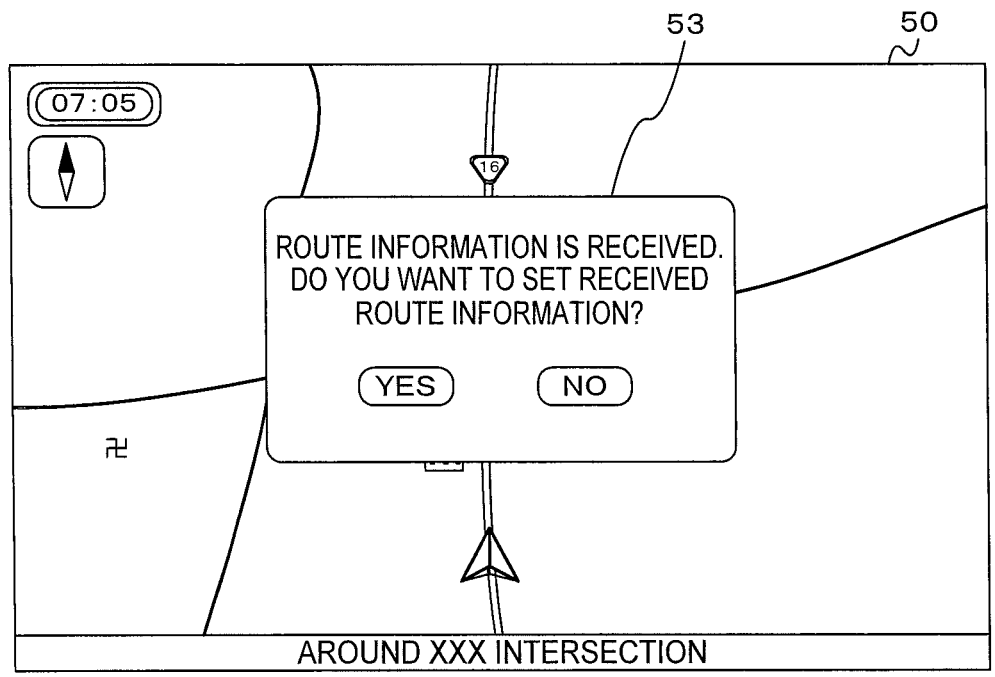
FIG. 6 conceptually illustrates one example of display screen 50 displayed on a display 106 of the navigation device 30.

Next, the route guiding part 34 determines whether or not any route information is received from the center server 20 via the communication unit 14 (S101). If the route information is not received (S101: No), the text converter 37 executes the process as shown in the step S105. If the route information is received (S101: Yes), the route guiding part 34 displays on the display 106, a message inquiring whether or not the route information being received is to be set (S102). As shown in FIG. 6 by way of example, the route guiding part 34 displays a setting confirmation message in the form of a pop-up 53 on the display screen 50 of the display 106.

Next, the route guiding part 34 determines whether or not setting of the route information is permitted by the user via the input unit 111 (S103). If setting of the route information is not permitted (S103: No), the route guiding part 34 discards the route information being received, and the text converter 37 executes the processing shown in the step S105.

On the other hand, if setting of the route information is permitted (S103: Yes), the route guiding part 34 sets the route information being received, and starts route guidance, based on the data within the link data storage 33 and the current position being calculated by the current position calculation part 31 (S104). During the route guidance, the route guiding part 34 displays on the display 106, an image representing the route being set and outputs from the speaker 110, a voice for guidance at an intersection on the route being set.

Next, the text converter 37 determines whether or not the user has sent a message to be posted in the chat (S105). By way of example, if a voice generated by the user is accepted via the microphone 109, while a switch (not illustrated) is in the state of pressed for instructing an input of a message to be posted in the chat, the text converter 37 determines that the user has sent the message to be posted in the chat.

If the user has sent the message to be posted in the chat (S105: Yes), the text converter 37 converts the voice of the user into a text file by using a speech recognition technique, and transmits the chat message being converted into the text file to the message transmitter and receiver 35. The message transmitter and receiver 35 transmits the chat message received from the text converter 37, in association with the user ID and the ID of the navigation device 30, to the center server 20 via the communication unit 14 (S106), and the text converter 37 executes again the processing shown in the step S105.

On the other hand, if the user does not send a message to be posted in the chat (S105: No), the message transmitter and receiver 35 determines whether or not a chat message is received from the center server 20, via the communication unit 14 (S107). Upon receipt of the chat message (S107: Yes), the message transmitter and receiver 35 displays the chat message being received on the display 106, and further transfers the chat message to the audio converter 36.

Figure 7A:
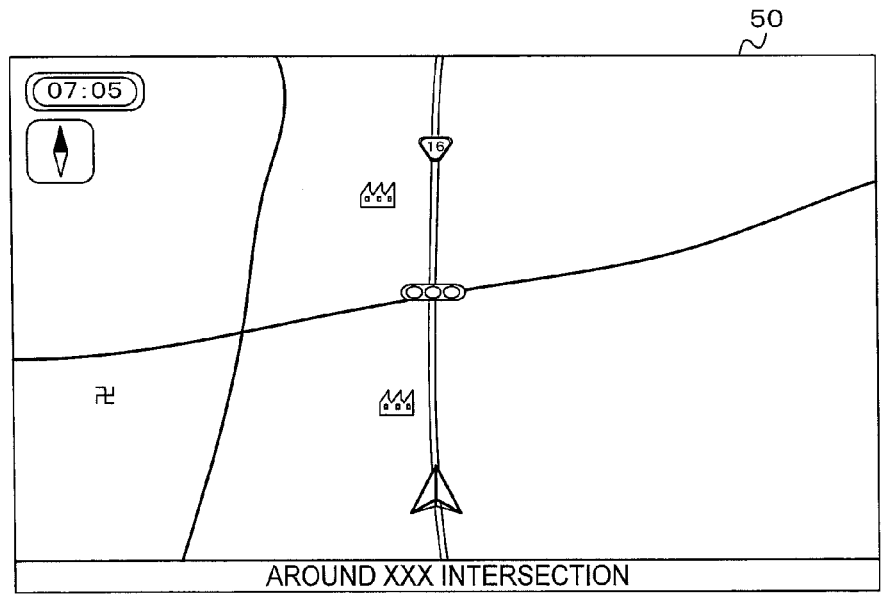
FIG. 7 conceptually illustrates one example of the display screen 50 displayed on the display 106 of the navigation device 30.
Figure 7B:
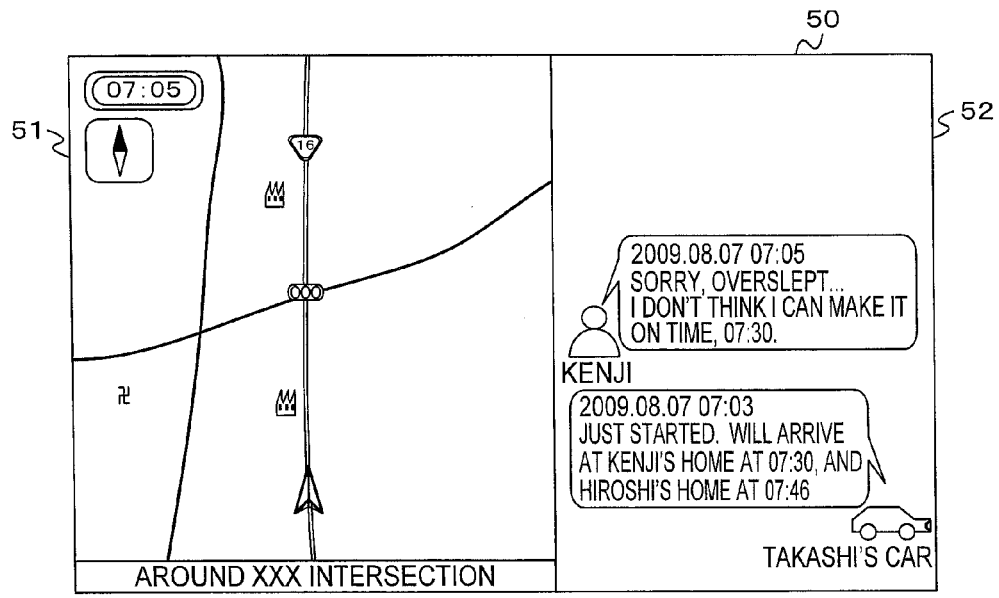

For example, if the chat message is received while the display screen 50 of the display 106 is in the state as shown in FIG. 7(a), the message transmitter and receiver 35 divides the display screen 50 into two regions as shown in FIG. 7(b). Then, the contents shown before are continuously displayed in one region 51, and in the other region 52, the chat message being received is displayed. FIG. 7(b) illustrates a display example when the chat message from a user "Kenji" is received. On this occasion, it is preferable that past chat messages having been received since the time when the navigation device 30 was started are displayed to the extent possible.

Next, the audio converter 36 reads out the chat message received from the message transmitter and receiver 35, by the use of synthesized voice according to the TTS (Text-To-Speech), and outputs the voice via the speaker 110 (S108), and the text converter 37 executes again the processing shown in the step S105.

In the step S107, if a chat message is not received (S107: No), the route guiding part 34 determines whether or not the status of the vehicle 13 on which the navigation device 30 is mounted is changed (S109). The status change of the vehicle 13 includes following cases, for example; a change of the current position of the navigation device 30 by a distance equal to more than a predetermined distance, a change of required time until arriving a destination point by a time equal to or longer than a predetermined period of time, a change of congestion state on a traveling road, and the like.

If the status of the vehicle 13 is changed (S109: Yes), the route guiding part 34 sends information indicating the status of the vehicle 13 to the message transmitter and receiver 35. The message transmitter and receiver 35 transmits via the communication unit 14, the status information received from the route guiding part 34 to the center server 20 as a chat message, together with the ID of the navigation device 30 (S110), and the text converter 37 executes again the processing shown in the step S105. It is also possible to configure such that even though there is no change in the status of the vehicle 13, the message transmitter and receiver 35 periodically transmits the status information of the vehicle 13 as a chat message, to the center server 20.

In the step S109, if there is no change in the status of the vehicle 13 (S109: No), the message transmitter and receiver 35 determines whether or not a command is received from the center server 20 via the communication unit 14 (S111). The command transmitted from the center server 20 may be a command inquiring the status of the vehicle 13 on which the navigation device 30 is mounted, and for example, it may be a command for inquiring a current position, a destination point, a scheduled arrival time, a congestion state of the traveling road, or the like.

Upon receipt of the command (S111: Yes), the message transmitter and receiver 35 transfers the received command to the route guiding part 34. The route guiding part 34 executes the processing associated with the command received from the message transmitter and receiver 35, and returns a result of the execution to the message transmitter and receiver 35. The message transmitter and receiver 35 transmits the result of the command execution as a chat message, together with the ID of the navigation device 30, to the center server 20 via the communication unit 14 (S112), and the text converter 37 executes again the processing shown in the step S105.

In the step S111, if there is no command being received (S111: No), the route guiding part 34 determines whether or not the power of the navigation device 30 is shut off (S113). If the power of the navigation device 30 is shut off (S113: Yes), the positional information transmitter 32 operates by the use of power feeding from a secondary battery or the like, and transmits the current position of the navigation device 30 the most recently calculated by the current position calculation part 31, together with the ID of the navigation device 30, to the center server 20 via the communication unit 14 (S114).

Next, the message transmitter and receiver 35 operates by the use of power feeding from the secondary battery or the like, transmits a logout request including the IDs of both the user and the navigation device 30, to the center server 20 via the communication unit 14 (S115), and the navigation device 30 terminates the operation shown in the flowchart.

In the step S113, if the power of the navigation device 30 is not shut off (S113: No), it is determined whether or not the route guiding part 34 has received new route information from the center server 20 via the communication unit 14 (S116). If new route information is received (S116: Yes), the route guiding part 34 executes again the processing shown in the step S102. On the other hand, if new route information is not received (S116: No), the text converter 37 executes the processing shown in the step S105.

It is to be noted that each functional block within the aforementioned navigation device 30 is established when the CPU 101 in FIG. 2 reads and executes predetermined programs. Therefore, the RAM 102 stores programs to implement the processing of each functional part.

Furthermore, each of the above constitutional elements is obtained by categorization on the basis of major processing details, in order to easily understand the configuration of the navigation device 30. Therefore, the present invention is not restricted according to a manner how to categorize the constitutional elements or their names. The configuration of the navigation device 30 may be categorized into much more constitutional elements, depending on processing details. It is further possible to categorize in such a manner that one constitutional element executes much more processing.

In addition, each functional part may be established by hardware (ASIC, GPU, or the like). A piece of hardware may execute the processing of each functional part, or multiple pieces of hardware may execute the same.

Figure 8:
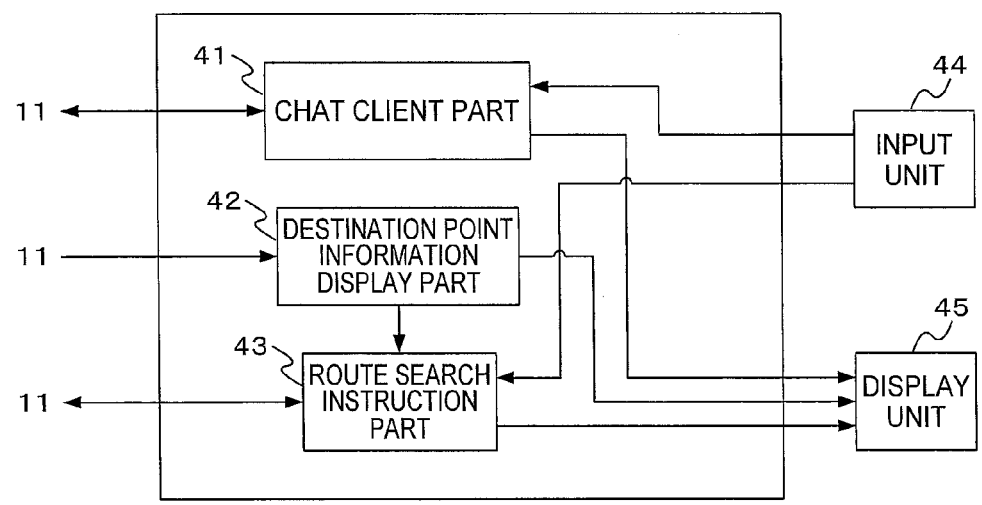
FIG. 8 is a block diagram showing one example of functional configuration of a user terminal 40.

Next, an explanation will be made as to the user terminal 40. FIG. 8 is a block diagram showing one example of the functional configuration of the user terminal 40. The user terminal 40 incorporates a chat client part 41, a destination point information display part 42, and a route search instruction part 43. The user terminal 40 is connected to an input unit 44 and a display unit 45.

Figure 9:
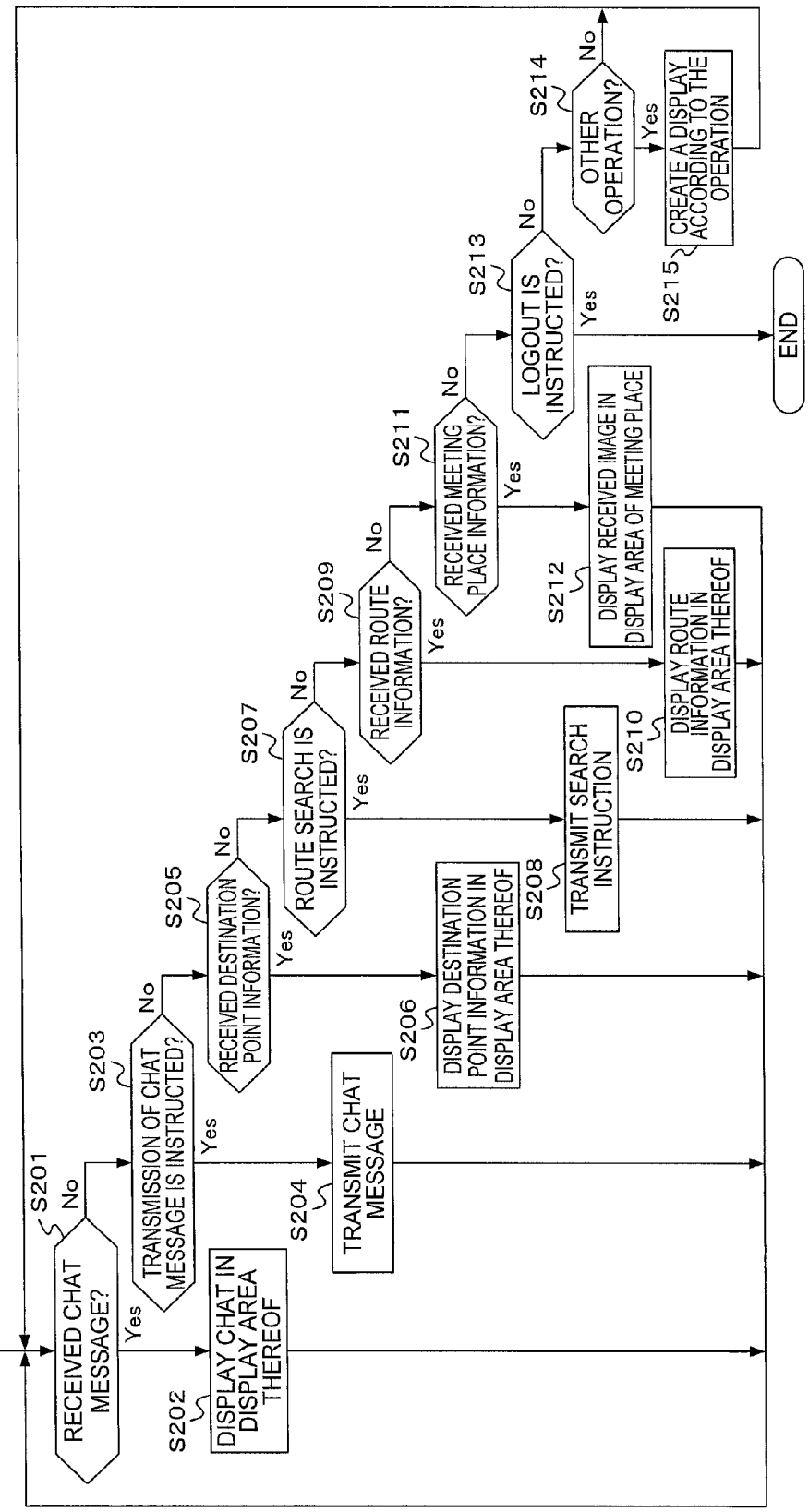
FIG. 9 is a flowchart showing one example of operation of the user terminal 40.

Next, with reference to FIG. 9, an operation of the user terminal 40 will be explained. FIG. 9 is a flowchart showing one example of the operation of the user terminal 40. By way of example, power is activated, and the user terminal 40 transmits a login request with the use of the user ID to the center server 20, the request including the user ID, an ID of the navigation device 30, and a password. When the login is successful, the user terminal 40 starts the operation as shown in the flowchart.

Figure 10:
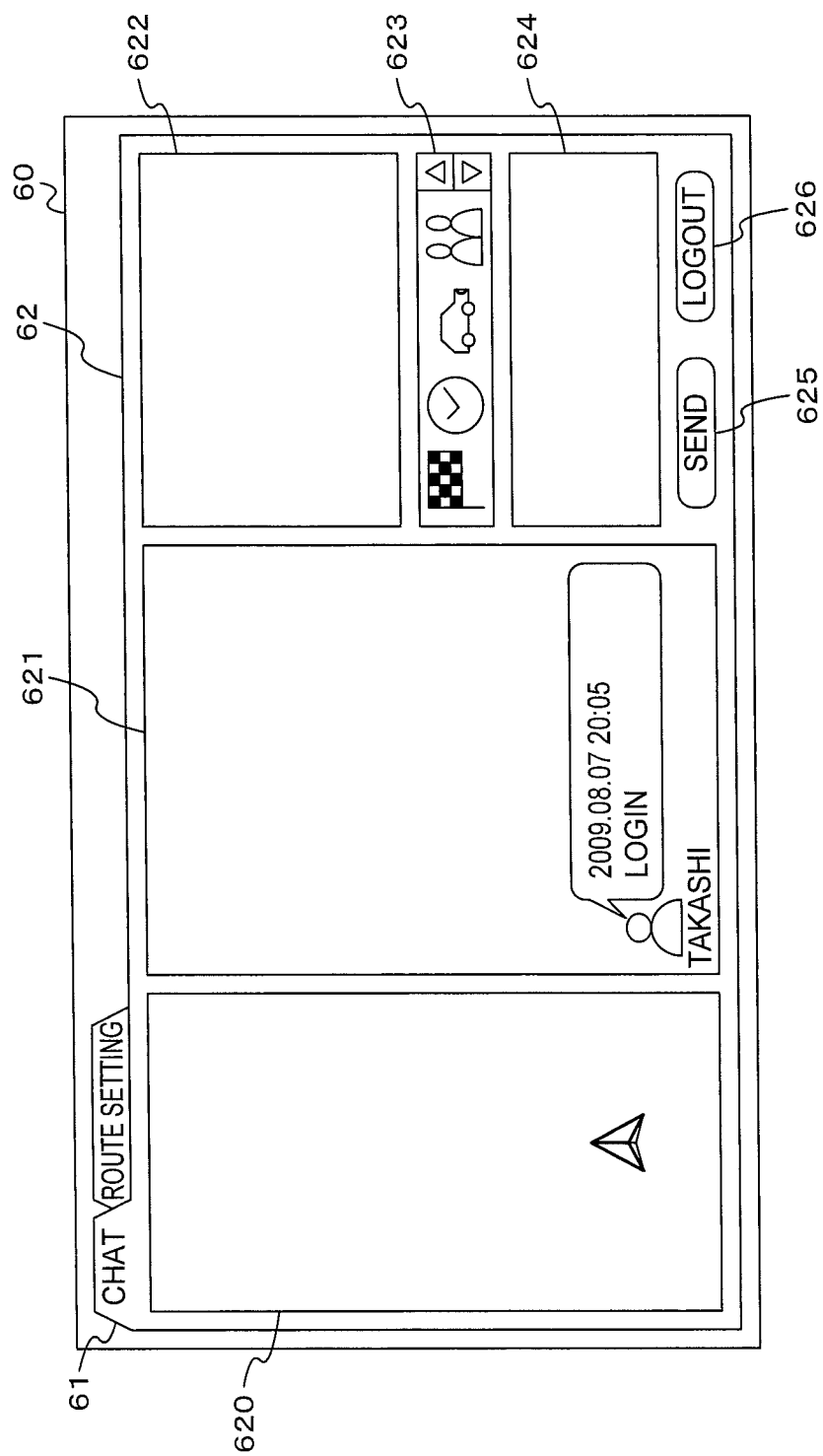
FIG. 10 conceptually illustrates one example of a display screen 60 displayed on a display unit 45 of the user terminal 40.

Firstly, the chat client part 41 displays on the display unit 45, a display screen 60 as shown in FIG. 10 (S200). The display screen 60 is provided with display areas with respect to each service type 61. In the display area 62 associated with the chat service, there are displayed an area 620 for displaying a list of the destination point, an area 621 for displaying a chat message, an area 622 for displaying an image of a meeting place, an area 623 for displaying predetermined symbols, an area 624 for writing a chat message, a send button 625 for sending the chat message being written in the area 624, and a logout button 626 for sending a logout request to the center server 20.

Figure 11:
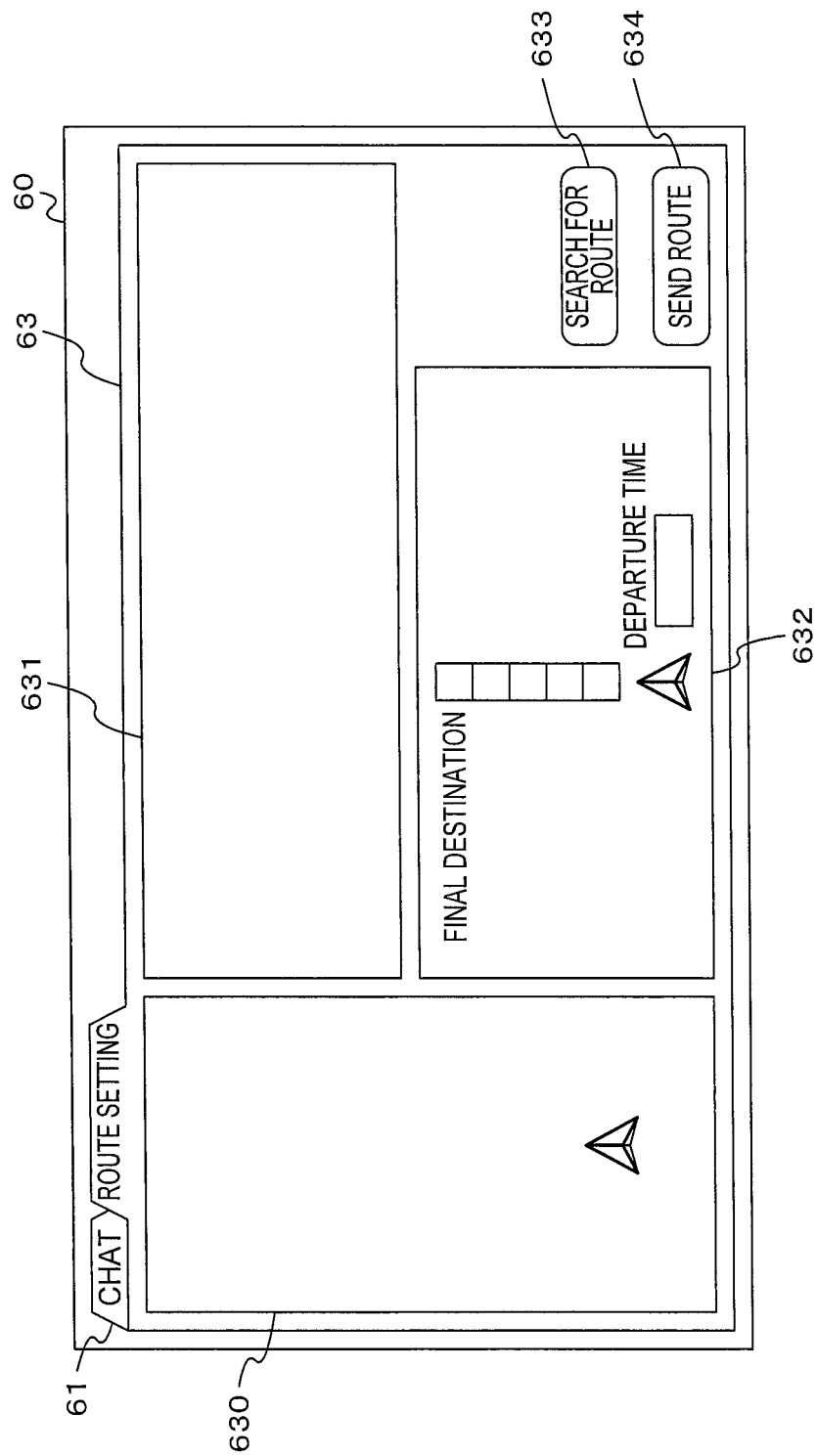
FIG. 11 conceptually illustrates one example of the display screen 60 displayed on the display unit 45 of the user terminal 40.

As shown in FIG. 11, in the area 63 associated with a route setting service, there are displayed, for instance, an area 630 for displaying a list of the destination point, an area 631 for displaying an overview of the route being decided, an area 632 for setting the order of passing the destination points and a departure time, a route search button 633 for giving a route search instruction to the center server 20, and a send route button 634 for sending the route information being decided to the navigation device 30. It is to be noted that in the area 630, there is displayed information similar to the information in the area 620.

Figure 12:
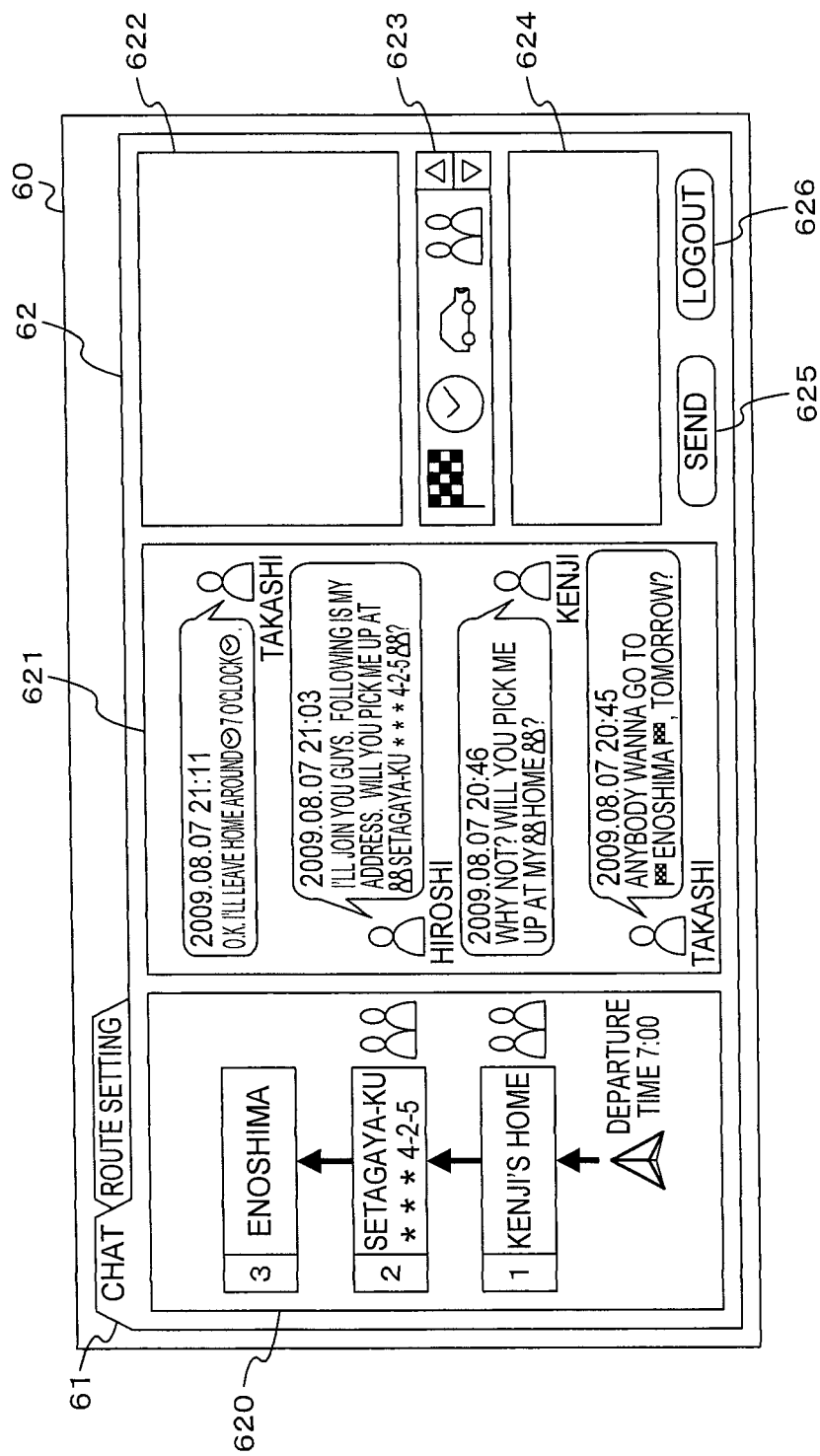
FIG. 12 conceptually illustrates one example of the display screen 60 displayed on the display unit 45 of the user terminal 40.

With reference to FIG. 9 again, an explanation will be continued. The chat client part 41 determines whether or not a chat message is received from the client server 20 via the communication line 11 (S201). Upon receipt of the chat message (S201: Yes), for example as shown in FIG. 12, the chat client part 41 displays the chat message being received in the area 621 (S202), and executes again the processing shown in the step S201.

On the other hand, if the chat message is not received (S201: No), the char client part 41 determines whether or not the send button 625 has been pressed according to a manipulation of the input unit 44 by the user, thereby determining whether or not there is provided an instruction for sending the chat message (S203). If the instruction for sending the chat message is provided (S203: Yes), the chat client part 41 transmits the text inputted in the area 624 as a chat message together with the IDs of both the user and the navigation device 30, to the center server 20 via the communication line 11 (S204), and executes again the processing shown in the step S201.

It is to be noted that the user manipulates the input unit 44 to select a symbol within the area 623, allowing the symbol to be embedded within the text in the area 624. The chat client part 41 converts in advance the symbol embedded in the area 624 into a symbol ID assigned to this symbol, and transmits the symbol ID to the center server 20.

If the instruction for sending of the chat message is not provided in the step S203 (S203: No), the destination point information display part 42 determines whether or not destination point information is received (S205). Here, the destination point information corresponds to at least one character string which is associated with a number.

If the destination point information is received (S205: Yes), the destination point information display part 42 displays the destination point information being received in the area 620 and in the area 630 (S206), and the chat client unit 41 executes again the processing shown in the step S201. As shown in FIG. 12, by way of example, the destination point information display part 42 arranges in a line, the information items with respect to each of the character strings included in the destination point information, in ascending order of the numbers respectively associated therewith, from the nearest to the farthest, starting from the car mark representing the vehicle current position.

It is to be noted that upon receipt of a departure time from the center server 20, the destination point information display part 42 displays the departure time being received next to the car mark displayed in the area 620 shown in FIG. 12. In addition, when a character string included in the destination point information is associated with information indicating that the point is a meeting place, the destination point information display part 42 displays a symbol representing the meeting place on the side of the character string.

In the step S205, if the destination point information is not received (S205: No), the route search instruction part 43 determines whether or not the route search button 633 is pressed according to a manipulation of the input unit 44 by the user, thereby determining whether or not an instruction for searching for a route is provided (S207). If the instruction for searching for a route is provided (S207: Yes), the route search instruction part 43 provides a route search instruction to the center server 20 via the communication circuit 11, based on the descriptions set in the area 632, and the chat client part 41 executes again the processing shown in the step S201.

Figure 13:
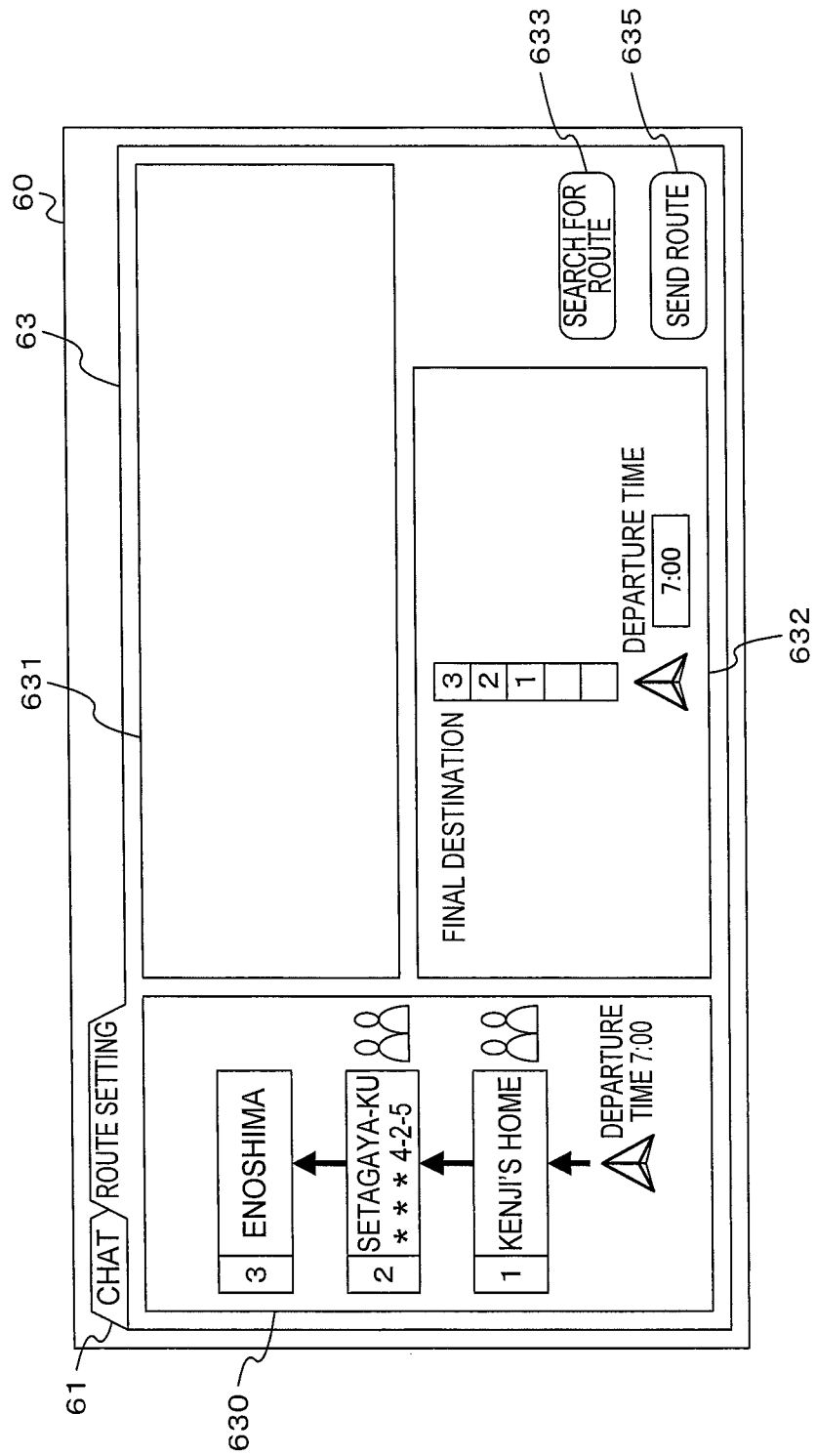
FIG. 13 conceptually illustrates one example of the display screen 60 displayed on the display unit 45 of the user terminal 40.

For example, if the route search button 633 is pressed while the display screen 60 is in the state as shown in FIG. 13, the route search instruction part 43 specifies the character string being associated with each number displayed within the square in the area 632, and provides an instruction to the center server 20 for searching for a route which passes the points sequentially from the point of the character string associated with the square being the nearest the car mark. In the example of FIG. 13, the squares in the area 632 are displayed respectively including the numbers "1", "2", and "3", in ascending order of distance from the car mark, and therefore, the route search instruction part 43 provides an instruction to the center server 20, to search for a route which passes the points in order of the followings; "Kenji's home", "Setagaya-ku***4-2-5", and "Enoshima".

In the example shown in FIG. 13, the descriptions displayed in the area 630 are automatically displayed in the area 632, and the user is allowed to freely change the sequence of the passing points according to the manipulation via the input unit 44. The departure time within the area 632 is similarly modifiable, according to the manipulation of the input unit 44 by the user. In addition, the user manipulates the input unit 44 to delete any of the number indicating the destination place, being displayed in the area 632, thereby allowing a search for a route that does not pass the destination point corresponding to the deleted number.

Figure 14:
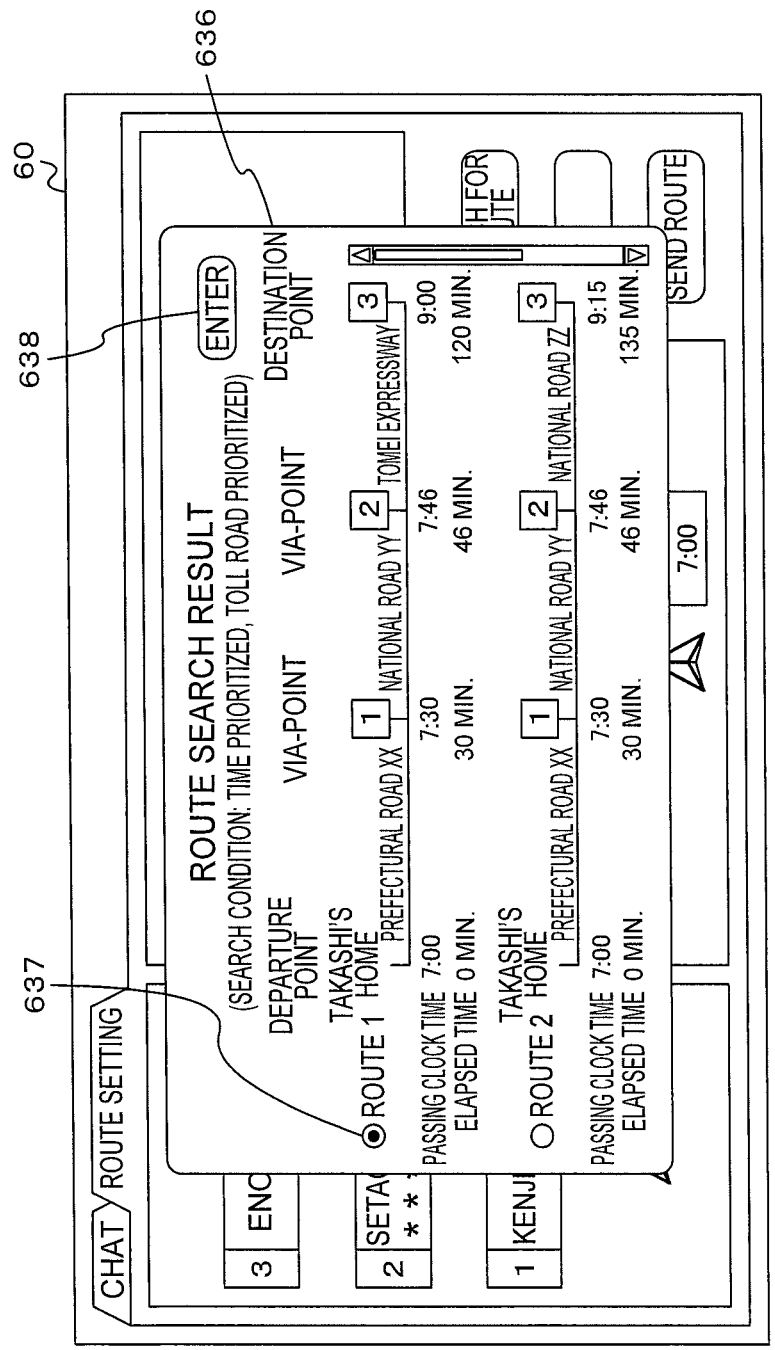
FIG. 14 conceptually illustrates one example of the display screen 60 displayed on the display unit 45 of the user terminal 40.
Figure 15:
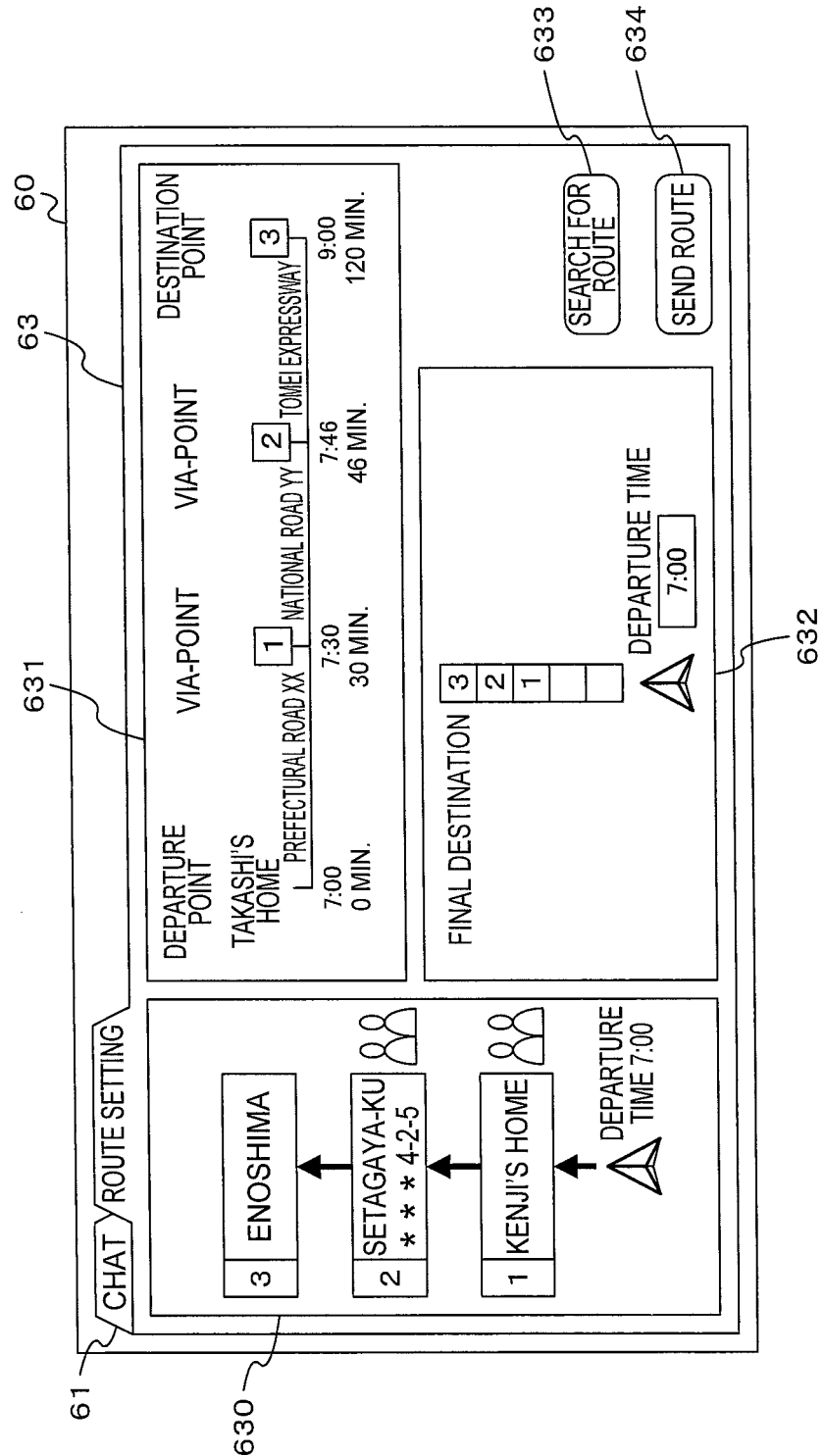
FIG. 15 conceptually illustrates one example of the display screen 60 displayed on the display unit 45 of the user terminal 40.

After transmitting the route search instruction to the center server 20, the route search instruction part 43 receives a search result from the center server 20, and displays the search result being received on the display screen 60 in a pop-up 636, as shown in FIG. 14, for instance. The user manipulates the input unit 44 to check a radio button 637 associated with one route in the search result, and press the decision button 638, thereby selecting one route out of a plurality of routes being retrieved. The route search instruction part 43 transmits the ID of the selected route to the center server 20, and displays information of the selected route in the area 631, as shown in FIG. 15, for instance.

In the step S207, if the route searching is not instructed (S207: No), the route search instruction part 43 determines whether or not there is received information of the route selected by other user (S209). If the information of the route selected by other user is received (S209: Yes), the route search instruction part 43 displays the information of the route being received in the area 631 as shown in FIG. 15, for instance (S210), and the chat client part 41 executes again the processing shown in the step S201.

If the information of the route selected by other user is not received (S209: No), the chat client part 41 determines whether or not meeting place information is received (S211). The meeting place information represents an image being associated with the number indicating a via-point, the image showing a meeting spot at the via-point.

Figure 16:
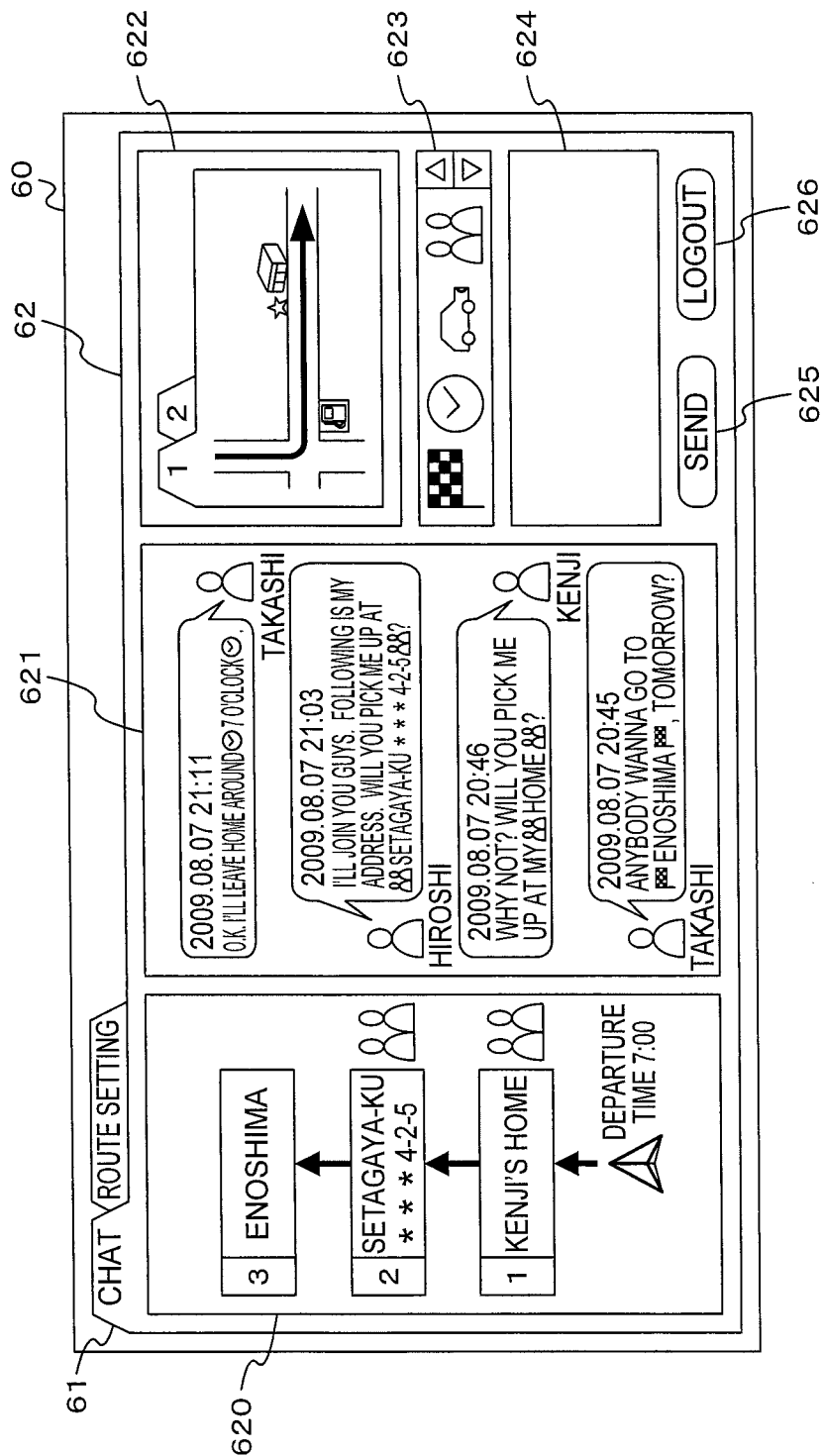
FIG. 16 conceptually illustrates one example of the display screen 60 displayed on the display unit 45 of the user terminal 40.

If the meeting place information is received (S211: Yes), the chat client 41 establishes association between the received image showing the meeting place and the number assigned to the character string indicating the corresponding point, and as shown in FIG. 16, for example, displays the image in the area 622 (S212). The chat client part 41 executes again the processing shown in the step S201.

If the meeting place information is not received in the step S211 (S211: No), the chat client part 41 determines whether or not the logout button 626 is pressed according to the manipulation of the input unit 44 by the user, thereby determining whether or not the logout is instructed (S213). If the logout is instructed (S213: Yes), the chat client part 41 transmits a logout request including the IDs of both the user and the navigation device 30 to the center server 20, and terminates the operation shown in the flowchart.

If the logout is not instructed (S213: No), the chat client part 41 determines whether or not there are any other manipulations via the input unit 44 by the user (S214). If there are not any other manipulations (S214: No), the chat client part 41 executes again the processing shown in the step S201.

If there are other manipulations (S214: Yes), the chat client part 41 makes a display according to the manipulations. It is to be noted that if the send route button 634 is pressed in the route setting screen, according to the manipulation of the input unit 44 by the user, the route search instruction part 43 transmits to the center server 20, a send-route instruction for sending the route information to the navigation device 30, the route information including the navigation ID and being displayed in the area 631.

Figure 17:
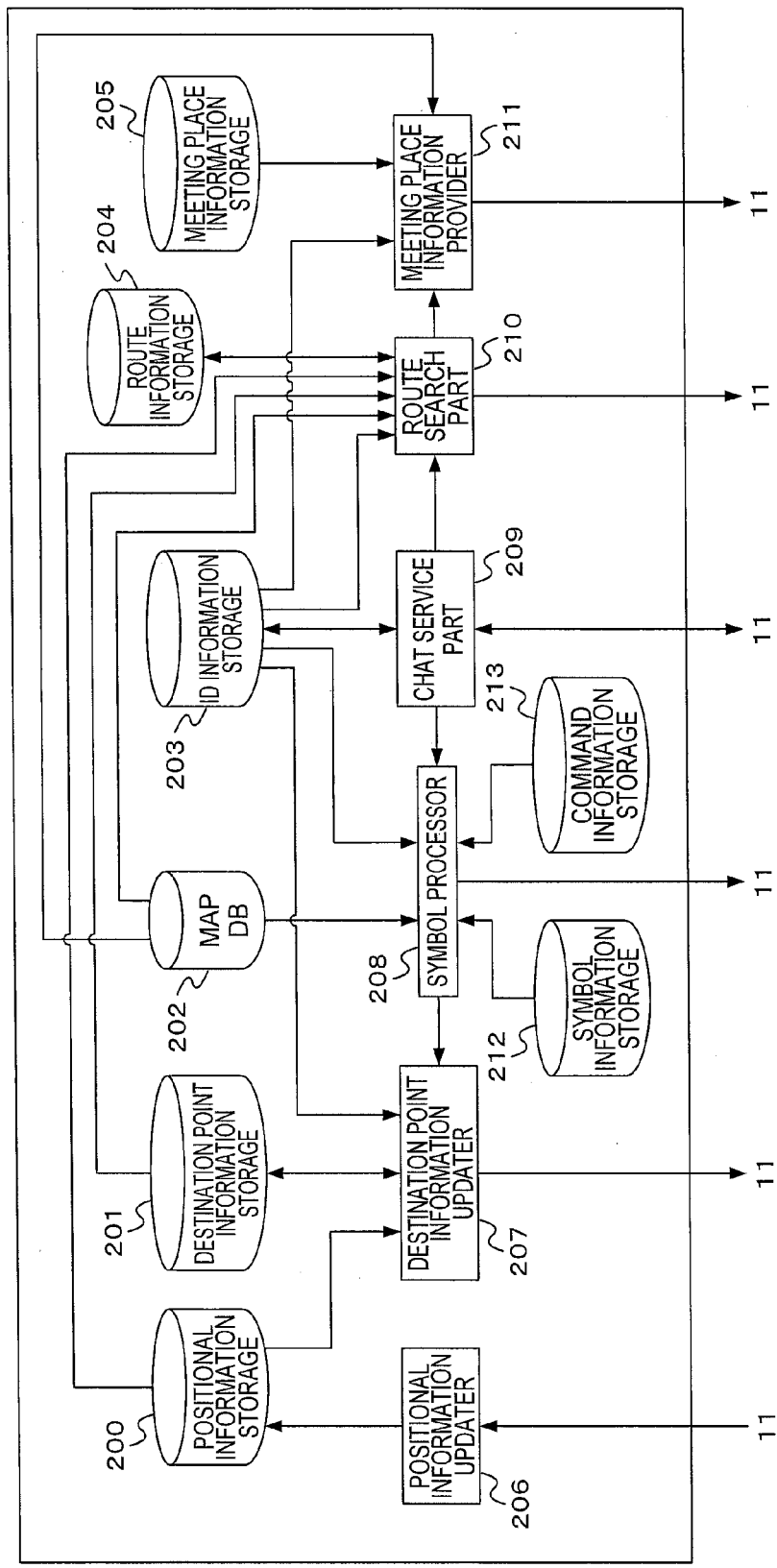
FIG. 17 is a block diagram showing one example of functional configuration of a center server 20.

Next, an explanation will be made as to the center server 20. FIG. 17 is a block diagram showing an example of the functional configuration of the center server 20. The center server 20 incorporates a positional information storage 200, a destination point information storage 201, a map DB (database) 202, an ID information storage 203, a route information storage 204, a meeting place information storage 205, a positional information updater 206, a destination point information updater 207, a symbol processor 208, a chat service part 209, a route search part 210, a meeting place information provider 211, a symbol information storage 212, and a command information storage 213.

As shown in FIG. 18, for example, the positional information storage 200 stores, in association with the navigation ID 2000 for identifying each of the navigation devices 30, positional information 2001 of the navigation device 30, an address 2002 of the navigation device 30, and an update date and time 2003 indicating the date and time when the positional information 2001 is updated for the last time. An IP address represents the address 2002, for instance.

As shown in FIG. 19, for example, the destination point information storage 201 stores a destination point table 2011 with respect to each navigation ID 2010. Each destination point table 2011 stores, in association with each destination point table 2011 representing a destination point, positional information 2013 of the point, and a meeting place flag 2014 indicating whether or not the point serves as a meeting place. The meeting place flag 2014 stores "1" when the associated point is designated as a meeting place, whereas it stores "0" when the associated point is not designated as a meeting place.

The map DB 202 stores in advance a point information table 2020 as shown in FIG. 20. The point information table 2020 stores, in association with multiple character strings 2021 representing points, positional information 2022 of the point, and a facility name 2023 located at the point.

The ID information storage 203 stores a table 2031 with respect to each navigation ID 2030, as shown in FIG. 21, for instance. Each table 2031 stores, in association with the user ID 2032 for identifying each user, a password 2033 used for authentication of the user, a status 2034 indicating whether or not the user logs in the chat, and an address 2035 of the user terminal 40 which the user is using. The status 2034 stores "1" when the user being associated is in the state of login, whereas it stores "0" when the user being associated is not in the state of login. In the present embodiment, the navigation device 30 is allowed to participate in the chat as a user. Therefore, predetermined data items are stored also for the navigation device 30, respectively serving as the user ID, the password, and the like.

The route information storage 204 stores route information 2041 with respect to each navigation ID 2040, as shown in FIG. 22, for instance. The route information 2041 stores positional information of the departure point, a departure clock time, positional information of a destination point, a scheduled arrival time at the destination point, positional information of via-points to be passed between the departure point and the destination point, the clock time when each via-point is passed, a link ID to be passed between each of the points, and the like.

Figure 23:
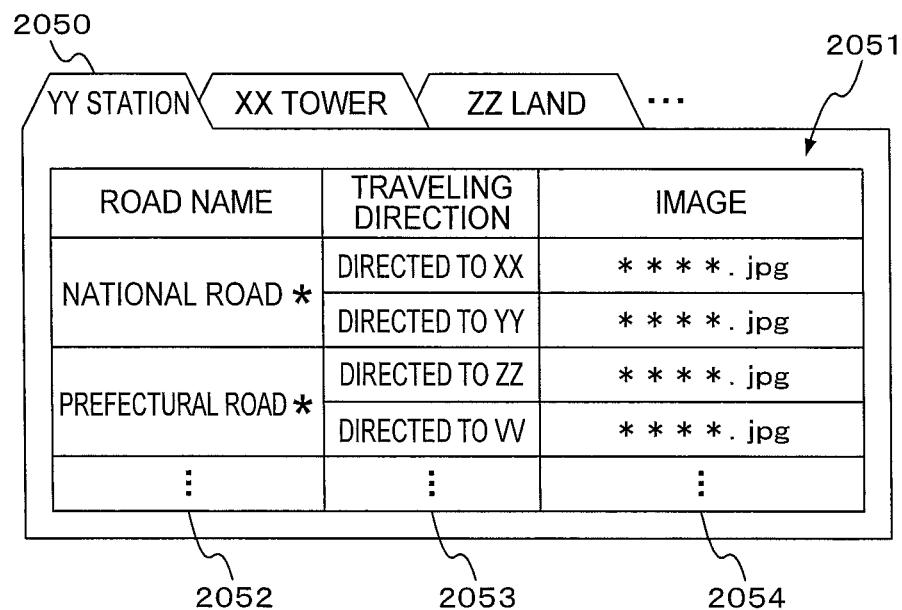
FIG. 23 conceptually illustrates one example of data structure stored in a meeting place information storage 205.

The meeting place information storage 205 stores a meeting place information table 2051 with respect to each facility name 2050, as shown in FIG. 23, for instance. Each meeting place information table 2051 stores in advance, an image 2054 representing a recommended meeting spot, with respect to each pair of a road name 2052 and a traveling direction 2053. With reference to the meeting place information storage 205, it is possible to obtain an image representing a spot suitable for meeting, depending on which direction the user goes on the road passing near a particular facility.

Figure 25:
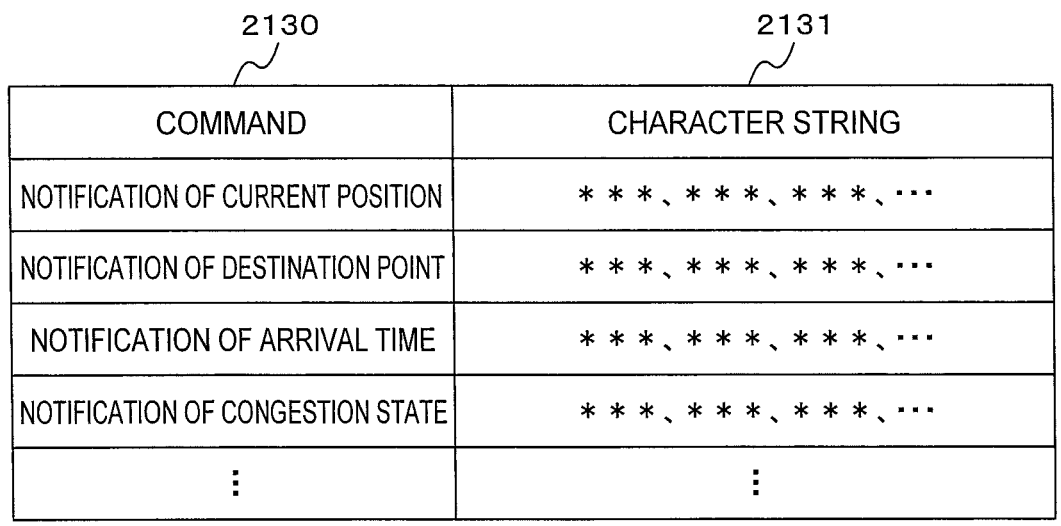
FIG. 25 conceptually illustrates one example of data structure stored in a command information storage 213.

As shown in FIG. 24, for instance, a symbol information storage 212 stores a symbol 2121 and a meaning 2122 of a text represented by the symbol 2121, in association with the symbol ID 2120 for identifying each symbol. The command information storage 213 stores in advance, in association with a command 2130, multiple character strings 2131 indicating the command 2130, as shown in FIG. 25, for instance.

Figure 26:
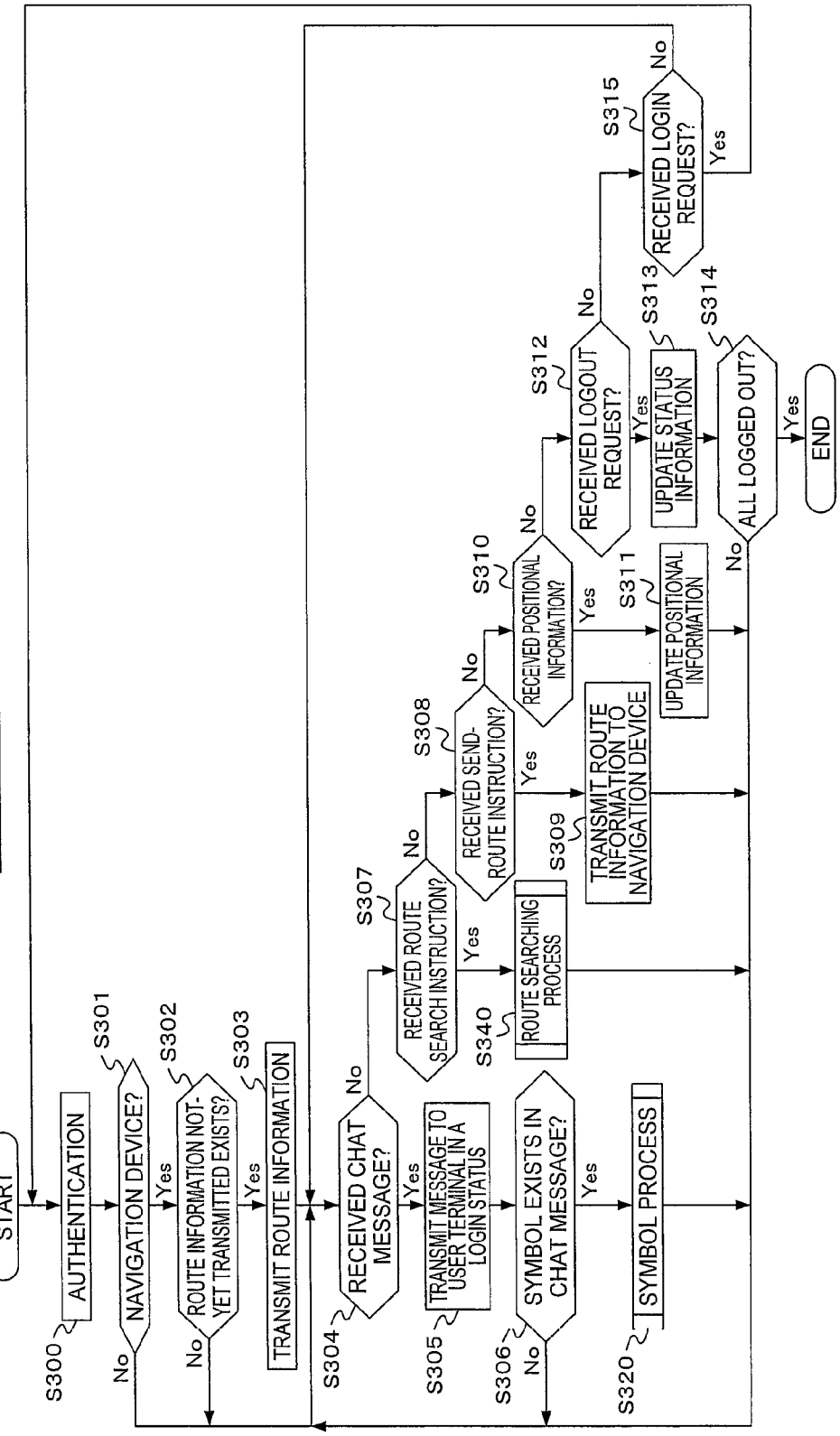
FIG. 26 is a flowchart showing one example of operation of the center server 20.

Next, with reference to FIG. 26, an operation of the center server 20 will be explained. FIG. 26 is a flowchart showing one example of the operation of the center server 20. Here, in the present embodiment, a chat bulletin board is provided for each navigation device 30, and each chat bulletin board is identified by the ID of the navigation device 30. By way of example, if there is a login request from the user terminal 40, to the chat bulletin board associated with a particular navigation device 30, the center server 20 starts the operation as shown in the flowchart.

The chat service part 209 receives the login request including the navigation ID, user ID, and password, and specifies a table associated with the navigation ID included in the received login request, within the ID information storage 203. Then, the chat service part 209 determines whether or not the password in the table being specified, which is associated with the user ID included in the login request being received, matches the password included in the login request, thereby authenticating the user (S300).

When authentication is successful, the chat service part 209 registers the source address from which the login command is transmitted in the ID information storage 203, and modifies the state of the sending source to be a value indicating a login state. Then, the chat service part 209 determines whether or not the navigation ID included in the login request matches the user ID, thereby determining whether or not the login source is a navigation device 30 (S301). If this login source is not a navigation device 30 (S301: No), the chat service part 209 executes the processing shown in the step S304.

If the login source is a navigation device 30 (S301: Yes), the chat service part 209 notifies the route search part 210 of the navigation ID. The route search part 210 refers to the route information storage 204 and determines whether or not there exists route information 2041 which is associated with the navigation ID received from the chat service part 209 (S302). If the route information 2041 associated with the navigation ID received from the chat service part 209 does not exist in the route information storage 204 (S302: No), the chat service part 209 executes the processing shown in the S304.

If the route information 2041 associated with the navigation ID received from the chat service part 209 exists (S302: Yes), the route search part 210 acquires from the ID information storage 203, the address of the navigation device 30 being the sending source of the login request, and transmits the associated route information to the navigation device 30 via the communication line 11 (S303). Then, the route search part 210 deletes the route information transmitted to the navigation device 30 from the route information storage 204.

Next, the chat service part 209 determines whether or not a chat message is received together with both the navigation ID and the user ID via the communication line 11 (S304). Upon receipt of the chat message (S304: Yes), the chat service part 209 refers to the table within the ID information storage 203, the table being associated with the navigation ID received with the chat message, and transmits via the communication line 11, the received chat message with the user ID, to the addresses stored in the table, corresponding to the addresses of users in the login status (S305).

When the chat message is transmitted, the user terminal 40 displays the chat message in the area 621, together with a display name associated with the user ID as shown in FIG. 12, for instance. It is to be noted if the navigation device 30 is in the login status, the chat message is transmitted also to the navigation device 30, and it is displayed as shown in FIG. 7(b), for instance.

Next, the chat service part 209 sends to the symbol processor 208, the received chat message together with the navigation ID. The symbol processor 208 determines whether or not a symbol registered in the symbol information storage 212 is included in the chat message received from the chat service part 209 (S306). If a predetermined symbol is not included in the chat message received from the chat service part 209 (S306: No), the chat service part 209 executes again the processing shown in the step S304.

On the other hand, if a predetermined symbol is included in the chat message received from the chat service part 209 (S306: Yes), the symbol processor 208 executes a symbol processing described below (S320), and the chat service part 209 executes again the processing shown in the step S304.

In the step S304, if the chat message is not received (S304: No), the route search part 210 determines whether or not there is received a route search instruction via the communication line 11, the route search instruction including a navigation ID, a character string, passing order of each character string, a departure time, a search condition, and the like (S307). Upon receipt of the route search instruction (S307: Yes), the route search part 210 executes the route searching process described below (S340), and the chat service part 209 executes again the processing shown in the step S304.

In the step S307, if the route search instruction is not received (S307: No), the route search part 210 determines whether or not a send-route instruction including the navigation ID is received from the user terminal 40 (S308). Upon receipt of the send-route instruction (S308: Yes), the route search part 210 refers to the route information storage 204, and acquires the route information which is calculated in the step S340 described below and stored in the route information storage 204 in association with the navigation ID. Then, the route search part 210 transmits the acquired route information to the navigation device 30 associated with the navigation ID included in the send-route instruction (S309), and the chat service part 209 executes again the processing shown in the step S304.

It is to be noted that if the navigation device 30 is activated and receives successfully the route information being transmitted, the route search part 210 deletes the route information being transmitted from the route information storage 204. If the navigation device 30 is not activated, and fails to normally receive the route information being transmitted, the route search part 210 does not delete the route information from the route information storage 204 until the navigation device 30 is activated.

In the step S308, if the send-route instruction is not received (S308: No), the positional information updater 206 determines whether or not positional information is received together with the navigation ID via the communication line 11 from the navigation device 30 (S310). If the positional information is received together with the navigation ID (S310: Yes), the positional information updater 206 refers to the positional information storage 200, updates the positional information associated with the received navigation ID, to the received positional information, and updates the update date and time (S311), and the chat service part 209 executes again the processing shown in the step S304.

If the positional information is not received together with the navigation ID in the step S310 (S310: No), the chat service part 209 determines whether or not a logout request including the navigation ID and the user ID is received (S312). Upon receipt of the logout request (S312: Yes), the chat service part 209 specifies within the ID information storage 203, a table associated with the navigation ID included in the received logout request.

Then, the chat service part 209 updates the state being associated with the user ID included in the received login request, to the information indicating not being in the login state (S313), and determines whether or not all the users registered in the table are in the state of logout (S314). If a user in the login state exists (S314: No), the chat service part 209 executes again the processing shown in the step S304. If all the users are in the state of logout (S314: Yes), the center server 20 terminates the operation as shown in the flowchart.

In the step S312, if a logout request is not received (S312: No), the chat service part 209 determines whether or not a new login request is received (S315). If a new login request is received (S315: Yes), the chat service part 209 executes again the processing shown in the step S300. On the other hand, if a new login request is not received (S315: No), the chat service part 209 executes again the processing shown in the S304.

Figure 27:
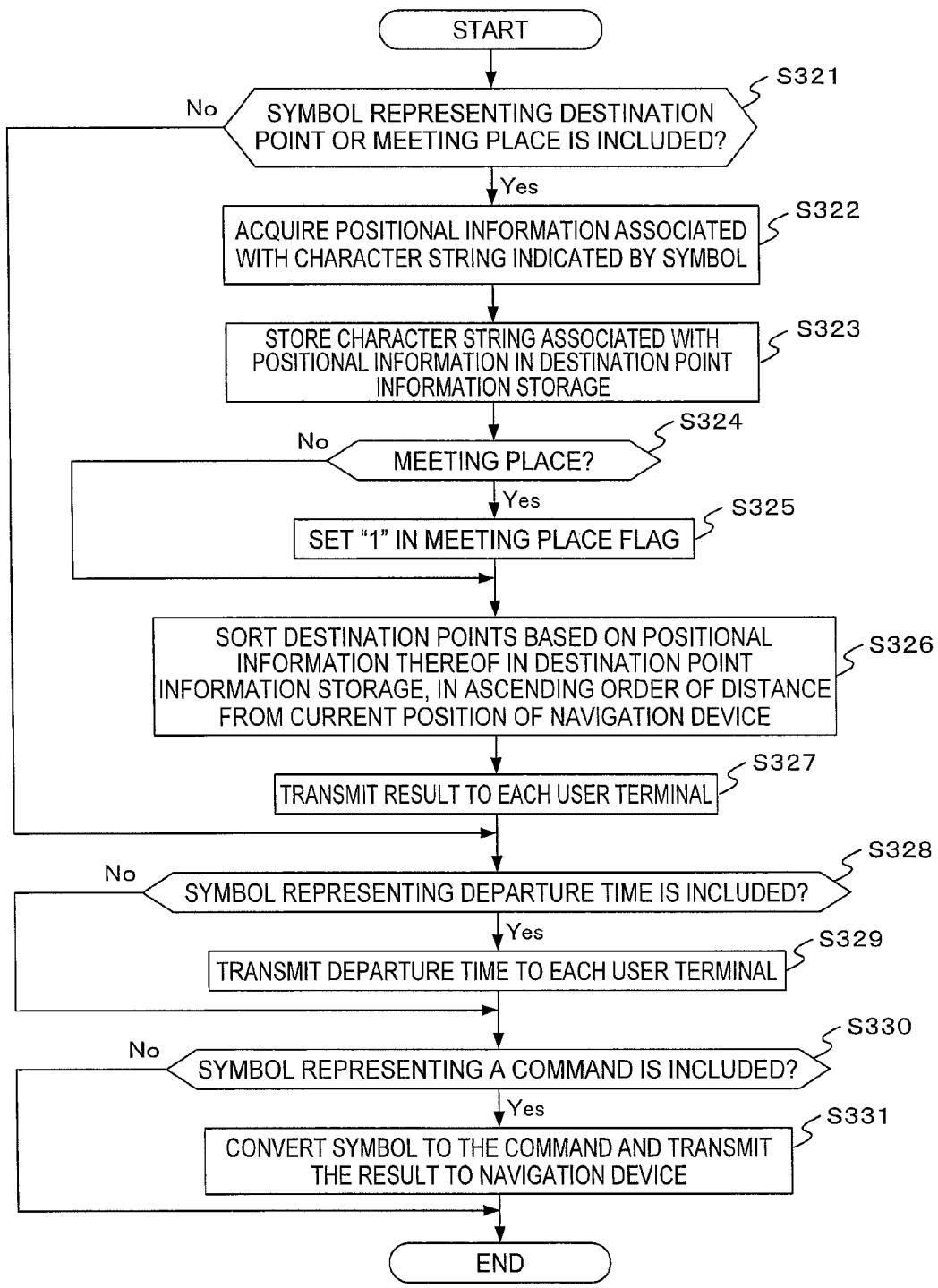
FIG. 27 is a flowchart showing one example of a symbol process (S320) executed by the center server 20.

Next, with reference to FIG. 27, the symbol processing in the step S320 will be explained.

Firstly, the symbol processor 208 refers to the symbol information storage 212, and determines whether or not a symbol representing a destination point or a meeting place point is included in the chat message received from the chat service part 209 (S321). If neither a symbol representing the destination point nor a symbol representing the meeting place point is included in the chat message (S321: No), the symbol processor 208 executes the processing shown in the step S328.

If either a symbol representing the destination point or a symbol representing the meeting place is included in the chat message (S321: Yes), the symbol processor 208 extracts a character string indicated by the symbol from the chat message. In the present embodiment, the symbol processor 208 assumes a character string sandwiched by the symbols as the character string indicating the destination point or the meeting place, and extracts this character string. Then, the symbol processor 208 acquires positional information of the point associated with the character string being extracted, from the point information table 2020 within the map DB 202 (S322).

Next, the symbol processor 208 transfers the extracted positional information, together with the character string and the navigation ID received from the chat service part 209, to the destination point information updater 207. The destination point information updater 207 refers to the destination point information storage 201, and stores the character string received from the symbol processor 208, in association with positional information, in the destination point table associated with the navigation ID received from the symbol processor 208 (S323).

Next, the destination point information updater 207 determines whether or not the character string received from the symbol processor 208 corresponds to the character string designated by the symbol representing a meeting place (S324). If the character string is the one designated by the symbol representing a destination point (S324: No), the destination point information updater 207 executes the processing shown in the step S326.

If the character string is the one designated by the symbol representing a meeting place (S324: Yes), the destination point information updater 207 sets "1" in the meeting place flag associated with the character string, in the destination point table associated with the navigation ID received from the symbol processor 208 (S325). Then, the destination point information updater 207 acquires the positional information associated with the navigation ID received from the symbol processor 208 from the positional information storage 200, and based on the positional information of each character string within the destination point table associated with the navigation ID, sorts the character strings in ascending order of distance from the navigation device 30 (S326).

Next, the destination point information updater 207 assigns numbers in ascending order of distance from the navigation device 30 respectively to the sorted character strings. Then, the destination point information updater 207 refers to a table associated with the navigation ID received from the symbol processor 208, within the ID information storage 203, and transmits via the communication line 11 to the address of the user in the login state, the address being stored in the table, the character string indicating the destination point, together with the assigned number (S327). It is to be noted that as for the character string indicating the meeting place, the destination point information updater 207 transmits information indicating that it is the meeting place, in association with the character string.

Next, the symbol processor 208 refers to the symbol information storage 212, and determines whether or not a symbol representing a departure time is included in the chat message received from the chat service part 209 (S328). If the symbol representing a departure time is not included in the chat message (S328: No), the symbol processor 208 executes the processing shown in the step S330.

If the symbol representing the departure time is included in the chat message (S328: Yes), the symbol processor 208 extracts a character message indicated by the symbol from the chat message, and transmits the time associated with the extracted character string to the address of the user in the login state, via the communication line 11 (S329).

Next, the symbol processor 208 refers to the symbol information storage 212, and determines whether or not a symbol representing a command for controlling the navigation device 30 is included in the chat message received from the chat service part 209 (S330). If the symbol representing the command is not included in the chat message (S330: No), the symbol processor 208 terminates the operation as shown in the flowchart.

If the symbol representing a command is included in the chat message (S330: Yes), the symbol processor 208 extracts a character string indicated by the symbol, and acquires a command associated with the extracted character string, referring to the command information storage 213. Then, the symbol processor 208 transmits the command being acquired to the navigation device 30 via the communication line 11 (S331), the symbol processor 208 terminates the operation as shown in the flowchart.

Figure 28:
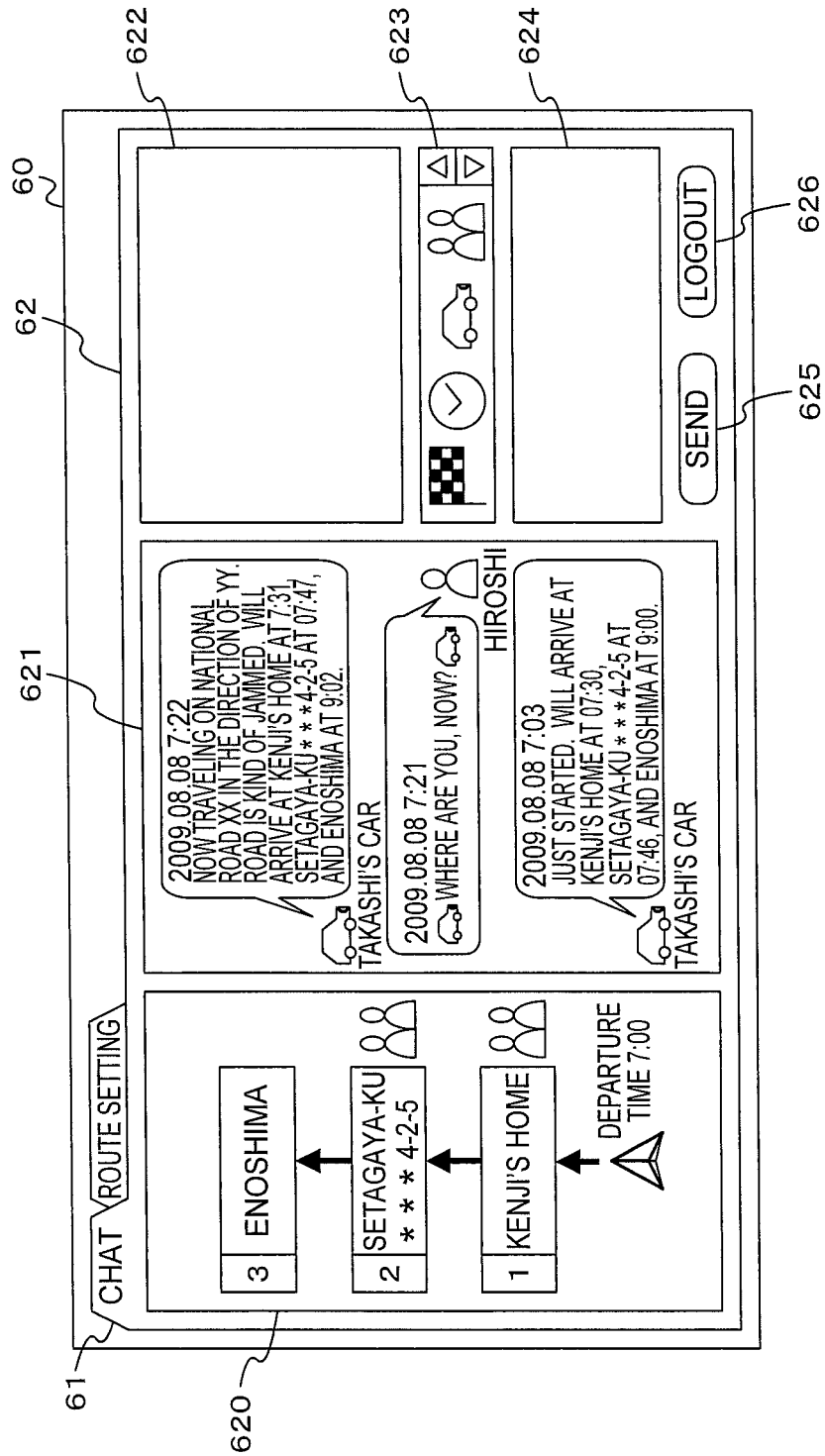
FIG. 28 conceptually illustrates one example of the display screen 60 displayed on the user terminal 40.

By way of example, as shown in FIG. 28, in the case where the user "Hiroshi" sends the character string indicating "Where are you now?" in association with the symbol representing the command for controlling the navigation device 30, the symbol processor 208 transmits to the navigation device 30, a control command associated with the character string (in this example, a command for notification of the current position, the congestion state, and the arrival time). The navigation device 30 transmits a result obtained by executing the control command to the center server 20, in the form of a chat message, and the chat message received by the chat service part 209 is transmitted to each of the user terminal 40 as a posting from the navigation device 30. Then, each of the user terminals 40 displays the chat message received from the navigation device 30, in the area 621 of the display screen 60.

Figure 29:
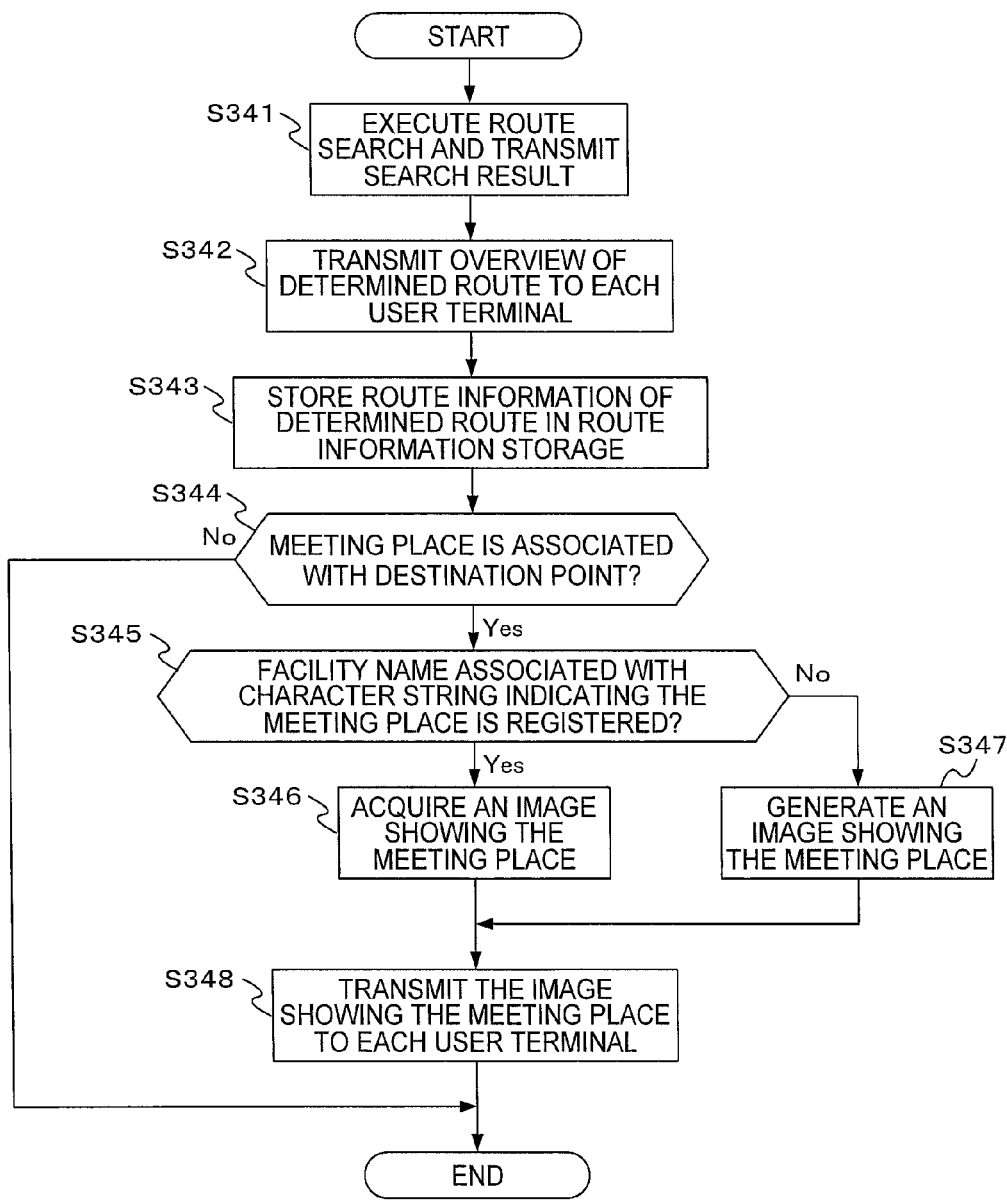
FIG. 29 is a flowchart showing one example of a route searching process (S340) executed by the center server 20.

Next, with reference to FIG. 29, a route searching process in the step S340 will be explained.

Firstly, the route search part 210 extracts from the destination point information storage 201, a destination point table associated with the navigation ID included in the route search instruction being received, and acquires from the extracted destination point table, the positional information associated with each character string included in the received route search instruction. Then, the route search part 210 refers to the positional information storage 200, the destination point information storage 201, and the map DB 202, and searches for a route which passes the positional information being acquired, in the passing order included in the route searching instruction, starting from the current position of the navigation device 30 associated with the navigation ID included in the route searching instruction, based on the departure time also included in the route searching instruction.

Then, the route search part 210 assigns a route ID to at least one route being retrieved, and transmits to the user terminal 40 of the user who sends the route searching instruction, an overview of each route being retrieved together with the route ID (S341). The user terminal 40 displays the overview of the route being received, in the pop-up 636 as shown in FIG. 14, for instance.

Next, upon receipt of the route ID from the user terminal 40, the route search part 210 transmits an overview of the route associated with the route ID being received, to the user terminal 40 of the user in the login state (S342). Then, the route search part 210 stores route information indicating details of the route associated with the received route ID in the route information storage 204, in association with the navigation ID (S343).

Next, the route search part 210 determines whether or not a character string as to which the meeting place flag "1" is set exists within the destination point table extracted from the destination point information storage 201 (S344). If the character string with the meeting place flag being set as "1" does not exist (S344: No), the route search part 210 terminates the route searching process as shown in the flowchart.

If the character string with the meeting place flag being set as "1" exists (S344: yes), the route search part 210 refers to the point information table 2020 within the map DB 202, and determines whether or not the character string is associated with a name of facility (S345). If the character string is associated with a name of facility (S345: Yes), the route search part 210 transfers information to the meeting place information provider 211, the information indicating the number representing the order for passing the facility being associated, as a via-point, a name of road used for passing through the facility, and a traveling direction on the road used for passing through the facility.

The meeting place information provider 211 refers to the meeting place information storage 205, to acquire a meeting place information table associated with the facility name received from the route search part 210. Then, the meeting place information provider 211 acquires from the meeting place information table being acquired, an image showing the meeting place which is associated with the road name and the traveling direction received from the route searching part 210. The meeting place information provider 211 transmits the image being acquired to the address of the user in the login state via the communication line 11 (S348), and terminates the route searching process as shown in the flowchart.

In the step S345, if the character string with the meeting place flag being set as "1" is not associated with a name of facility (S345: No), the route search part 210 transfers information regarding the positional information associated with the character string, to the meeting place information provider 211, the information including the number of the order for passing through the point indicated by the positional information as a via-point, a name of a road used for passing through the point, and a traveling direction on the road used for passing through the point.

The meeting place information provider 211 refers to the map DB 202, and generates an image representing a location preferable as a meeting place, in the case of traveling in the traveling direction received from the route search part 210, on the road associated with the road name received from the route search part 210, in the vicinity of the point received from the route search part 210 (S347), and executes the processing shown in the step S348. The location preferable as the meeting place indicates, for instance, a point which is on the left side of the traveling direction on the road passing in the vicinity of the meeting place, and it is at least a predetermined distance away from a bus stop or an intersection.

Figure 30:
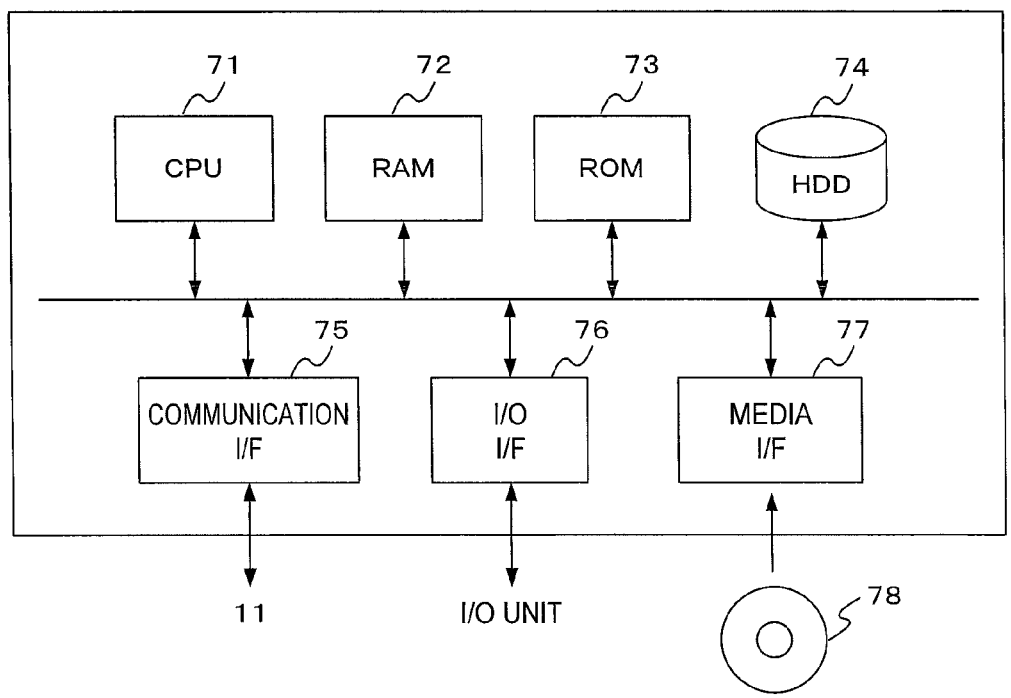
FIG. 30 is a hardware block diagram showing one example of a configuration of a computer 70 for implementing functions of the center server 20 or the user terminal 40.

FIG. 30 is a hardware block diagram showing one example of a configuration of a computer 70 to implement the functions of the center server 20 or the user terminal 40. The computer 70 incorporates a CPU 71, RAM 72, ROM 73, HDD 74, a communication interface (I/F) 75, an I/O interface (I/F) 76, and a media interface (I/F) 77.

The CPU 71 operates on the basis of the programs stored in the ROM 73 or in the HDD 74, and performs control of each part. The ROM 73 stores a boot program executed by the CPU 71 upon starting the computer 70, and programs and the like which depend on the hardware of the computer 70.

The HDD 74 stores programs executed by the CPU 71, and data and the like used by those programs. The communication interface 75 receives data from other equipment via the communication line 11 and sends the data to the CPU 71, and also transmits the data generated by the CPU 71 to other equipment via the communication line 11.

The CPU 71 controls via the I/O interface 76, the output unit such as a display and a printer, and the input unit such as a keyboard and a mouse. The CPU 71 acquires data from the input unit via the I/O interface 76. In addition, the CPU 71 outputs generated data to the output unit via the I/O interface 76.

The media interface 77 reads a program or data stored in the recording medium 78, to provide the program or data to the CPU 71 via the RAM 72. The CPU 71 loads the program from the recording medium 78 on the RAM 72 via the media interface 77, and executes the loaded program. The recording medium 78 is an optical recording medium such as a DVD (Digital Versatile Disk), and a PD (Phase change rewritable Disk), an optical magnetic recording medium such as an MO (Magneto-Optical disk), a tape medium, a magnetic recording medium, a semiconductor memory, or the like.

When the computer 70 functions as the center server 20, the CPU 71 of the computer 70 executes the programs loaded on the RAM 72, thereby implementing each of the functions of; the positional information storage 200, the destination point information storage 201, the map DB 202, the ID information storage 203, the route information storage 204, the meeting place information storage 205, the positional information updater 206, the destination point information updater 207, the symbol processor 208, the chat service part 209, the route search part 210, the meeting place information provider 211, the symbol information storage 212, and the command information storage 213.

The HDD 74 stores data within the positional information storage 200, the destination point information storage 201, the map DB 202, the ID information storage 203, the route information storage 204, the meeting place information storage 205, the symbol information storage 212, and the command information storage 213.

When the computer 70 functions as the user terminal 40, the CPU 71 of the computer 70 executes the programs loaded on the RAM 72, thereby implementing each of the functions of the chat client part 41, the destination point information display part 42, and the route search instruction part 43.

The CPU 71 of the computer 70 reads the aforementioned programs from the recording medium 78 and executes the programs. As an alternative example, those programs may be acquired from other device via the communication line 11.

As described above, the embodiment of the present invention has been explained.

As obvious from the aforementioned explanations, according to the Web bulletin board system 10 of the present embodiment, it is possible to reduce a burden of travel planning, when more than one person prepares a travel plan.

It should be understood that the present invention is not limited to the aforementioned embodiment, and the disclosed embodiment is susceptible of changes and modifications without departing from the scope of the invention.

By way of example, in the embodiment described above, special symbols different from a text are used to designate a destination point, a meeting place, a departure time, a command, and the like. However, the present invention is not limited to this embodiment, and the destination point and the like may be designated by using predetermined text characters (e.g., "@", "#", and the like), or a predetermined arrangement of text characters.

In addition, in the embodiment described above, the chat message received from the user terminal 40 includes a symbol designating a character string indicating any of the destination point, the meeting place, the departure time, and the command. However, the present invention is not limited to this embodiment. The chat message received from the user terminal 40 may additionally include a symbol designating the character string which indicates an arrival time or the like.

Further in the embodiment described above, as explained with reference to FIG. 13, only when the user decides the arrival sequence, it is determined which point is the final destination point, among the destination points extracted from the chat message, but the present invention is not limited to this embodiment. By way of example, two types are prepared as the symbol representing the destination point, and it may be configured such that one type defines a passing point, and the other defines a final destination point. With this configuration, it is possible to know which is the final destination point among the destination points extracted from the chat message, before the user decides the arrival sequence.

Therefore, at the time when the chat message designates the final destination point, the center server 20 is allowed to automatically search for the shortest route which passes through all the via-points and arrives at the final destination point, and provide the route to the user terminal 40 of each user terminal 40. This allows the Web bulletin board system 10 to support the travel planning more efficiently when more than one person prepares a travel plan.

Explanation of References

10 . . . WEB BULLETIN BOARD SYSTEM, 100 . . . ARITHMETIC PROCESSING UNIT, 101 . . . CPU, 102 . . . RAM, 103 . . . ROM, 104 . . . 105 BUS, 106 . . . DISPLAY, 107 . . . STORAGE UNIT, 108 . . . AUDIO INPUT AND OUTPUT UNIT, 109 . . . MICROPHONE, 110 . . . SPEAKER, 111 . . . INPUT UNIT, 112 . . . TOUCH PANEL, 113 . . . DIAL SWITCH, 114 . . . ROM UNIT, 115 . . . VEHICLE SPEED SENSOR, 116 . . . GYRO SENSOR, 117 . . . GPS RECEIVER, 118 . . . FM MULTIPLEX BROADCASTING RECEIVER, 119 . . . BEACON RECEIVER, 11 . . . COMMUNICATION LINE, 12 . . . BASE STATION, VEHICLE, 14 . . . COMMUNICATION UNIT, 20 . . . CENTER SERVER, 200 . . . POSITIONAL INFORMATION STORAGE, 201 . . . DESTINATION POINT INFORMATION STORAGE, 202 . . . MAP DB, 203 . . . ID INFORMATION STORAGE, 204 . . . ROUTE INFORMATION STORAGE, 205 . . . MEETING PLACE INFORMATION STORAGE, 206 . . . POSITIONAL INFORMATION UPDATER, 207 . . . DESTINATION POINT INFORMATION UPDATER, 208 . . . SYMBOL PROCESSOR, 209 . . . CHAT SERVICE PART, 210 . . . ROUTE SEARCH PART, 211 . . . MEETING PLACE INFORMATION PROVIDER, 212 . . . SYMBOL INFORMATION STORAGE, 213 . . . COMMAND INFORMATION STORAGE, 30 . . . NAVIGATION DEVICE, 31 . . . CURRENT POSITION CALCULATION PART, 32 . . . POSITIONAL INFORMATION TRANSMITTER, 33 . . . LINK DATA STORAGE, 34 . . . ROUTE GUIDING PART, 35 . . . MESSAGE TRANSMITTER AND RECEIVER, 36 . . . AUDIO CONVERTER, 37 . . . TEXT CONVERTER, 40 . . . USER TERMINAL, 41 . . . CHAT CLIENT PART, 42 . . . DESTINATION POINT INFORMATION DISPLAY PART, 43 . . . ROUTE SEARCH INSTRUCTION PART, 44 . . . INPUT UNIT, 45 . . . DISPLAY UNIT, 50 . . . DISPLAY SCREEN, 53 . . . POP-UP, 60 . . . DISPLAY SCREEN, 70 . . . COMPUTER, 71 . . . CPU, 72 . . . RAM, 73 . . . ROM, 74 . . . HDD, 75 . . . COMMUNICATION INTERFACE, 76 . . . I/O INTERFACE, 77 . . . MEDIA INTERFACE, 78 . . . RECORDING MEDIUM

What is claimed is:

1. A Web bulletin board system, comprising a navigation device, multiple user terminals, and a center server for communicating with the navigation device and the multiple user terminals via a communication network, wherein:

the center server comprises:
　a positional information storage for storing information indicating a current position of the navigation device;
　a symbol information storage for storing at least one symbol representing at least one destination point;
　a map database for storing positional information of a plurality of points in association with a plurality of character strings, each character string indicating the respective point;
　a destination point information storage for storing positional information of at least one first destination point, together with the associated character string;
　a center server processor; and
　a center server memory storing computer readable instructions that, when executed by the center server processor, implement:
　　a positional information updater for updating the information in the positional information storage, to information indicating the current position of the navigation device being received, upon receipt from the navigation device, of the information indicating the current position thereof;
　　a chat service part for managing an ID of a user logging in a chat, and upon receipt of a message from a user terminal used by the user logging in the chat, transmitting the message being received to all user terminals of all users logging in the chat;
　　a symbol processor for extracting, from the map database, the positional information of a point as at least one second destination point associated with the character string specified by the symbol, when the symbol representing the second destination point exists in the message that the chat service part received from the user terminal; and
　　a destination point information updater for additionally storing, in the destination point information storage, the character string and the positional information of the second destination point extracted by the symbol processor, sorting the character strings relating to the first and second destination points in the destination point information storage in ascending order of distance of the associated positional information from the current position of the navigation device, and transmitting to the user terminal of the user logging in the chat, the character strings being sorted, respectively in association with numbers in ascending order of distance from the current position of the navigation device;

the user terminal comprises:
　a user terminal processor; and
　a user terminal memory storing computer readable instructions that, when executed by the user terminal processor, implement:
　　a chat client part for transmitting, to the center server, a message inputted according to a manipulation by the user, and displaying the message transmitted from the center server; and
　　a destination point information display part for displaying the character strings transmitted from the center server, being sorted in ascending order of distance from the current position of the navigation device; and the navigation device comprises;
　a navigation device processor; and
　a navigation device memory storing computer readable instructions that, when executed by the navigation device processor, implement:
　　a current position calculation part for calculating the current position of the navigation device;
　　and a current position transmitter for transmitting to the center server, the current position calculated by the current position calculation part at a predetermined timing.

2. The Web bulletin board system according to claim 1, wherein:

the computer readable instructions of the user terminal, when executed by the user terminal processor, further implement a route search instruction part for transmitting, to the center server, a route search instruction together with information indicating passing order of points as to character strings being displayed in ascending order of distance from the current position of the navigation device by the destination point information display part, upon receipt of the route search instruction from the user, together with the information indicating the passing order according to a manipulation by the user;

the computer readable instructions of the center server, when executed by the center server processor, further implement a route search part for making a search for a route that passes through the points respectively associated with the character strings, in the order being designated, with reference to the map database, and transmitting information indicating the route being retrieved to the navigation device, upon receipt of the route search instruction from the user terminal together with the information indicating the passing order; and the computer readable instructions of the navigation device, when executed by the navigation device processor, further implement a route guiding part for executing route guidance according to the route received from the center server.

3. The Web bulletin board system according to claim 2, wherein;

the center server comprises a meeting place information storage for storing, in association with a name of a facility, a name of a road passing in the vicinity of the facility and an image showing a meeting place, as a third destination point, for each traveling direction on the road; and the computer readable instructions of the center server, when executed by the center server processor, further implement a meeting place information provider for acquiring, from the meeting place information storage, the image showing the meeting place corresponding to following information items, upon receipt of the information items indicating the name of the facility, the name of the road, and the traveling direction, and transmitting the image to the user terminal of the user logging in the chat;

wherein the symbol information storage further stores a symbol representing the meeting place;

wherein the map database further stores positional information of the facility and the name of the facility, in association with the character string specifying the facility;

wherein the symbol processor extracts, from the map database, the positional information of a point as the third destination point associated with the character string specified by the symbol, when the symbol representing the meeting place exists in the message that the chat service part received from the user terminal, and establishes association between the positional information being extracted and information indicating that the position is the meeting place;

wherein the destination point information updater additionally stores, in the destination point information storage, the character string indicating the meeting place and the positional information, being extracted by the symbol processor, sorts the character strings in the destination point information storage in ascending order of distance of the associated positional information from the current position of the navigation device, and transmits, to the user terminal of the user logging in the chat, the character strings being sorted, respectively in association with numbers in ascending order of distance from the current position of the navigation device; and wherein the route search part refers to the map database, upon receipt of the route search instruction from the user terminal, together with the information indicating the passing order as to each character string, searches for a route which passes the point associated with each character string in the order being designated, and transmits, to the meeting place information provider, as for the point being associated with the information indicating that the point is the meeting place, the name of the facility, the name of the road used upon passing the point, the traveling direction used upon passing the point, those being stored in the map database, in association with the positional information of the point.

4. The Web bulletin board system according to claim 3, wherein;

the meeting place information provider generates an image showing the meeting place corresponding to the name of the facility, the name of the road, and the traveling direction received from the route search part, when the image does not exist in the meeting place information storage, and transmits the image to the user terminal of the user logging in the chat.

5. The Web bulletin board system according to claim 2, wherein:

the route guiding part notifies the user of the navigation device, of a message for inquiring whether or not change of the route is permitted, upon newly receipt of information indicating a second route from the center server while executing the route guidance according to the route already set, deletes the route information currently used for the guidance when the user permits the change of the route, and executes the route guidance with a setting of the second route newly received.

6. The Web bulletin board system according to claim 2, wherein:

the symbol information storage further stores a symbol representing a departure time, and the symbol processor transmits to the user terminal of the user logging in the chat, the time corresponding to the character string specified by the symbol as the departure time, when the symbol representing the departure time exists within the message that the chat service part received from the user terminal.

7. The Web bulletin board system according to claim 2, wherein:

the symbol information storage further stores a symbol representing an arrival time, and the symbol processor transmits to the user terminal of the user logging in the chat, the time corresponding to the character string specified by the symbol as the arrival time, when the symbol representing the arrival time exists within the message that the chat service part received from the user terminal.

8. The Web bulletin board system according to claim 2, wherein:

the chat service part manages an ID of the navigation device as the ID of the user logging in the chat, upon a login from the navigation device, and upon receipt of a message from the navigation device, transmits the message being received to the user terminal of another user logging in the chat; and the computer readable instructions of the navigation device, when executed by the navigation device processor, further implement a message transmitter for logging in the chat provided by the center server, and transmitting to the center server status information including any of the current position of the navigation device, a required time up to the destination point, and a congestion state of the road currently traveling, as a message of the chat.

9. The Web bulletin board system according to claim 8, wherein:

while the navigation device logs in the chat, upon receipt of a message from the user terminal of the user logging in the chat, the chat service part transmits the message being received also to the navigation device, and the navigation device further comprises an audio converter for converting the message of the chat received from the center server into voice and outputting the voice.

10. The Web bulletin board system according to claim 8, wherein:

the center server further comprises a command information storage for storing a character string specifying a command, in association with the command inquiring a status of the navigation device;

the symbol information storage further stores a symbol representing an inquiry command to the navigation device;

the symbol processor extracts from the symbol information storage, the command associated with the character string specified by the symbol, when the symbol representing the inquiry command exists in the message that the chat service part received from the user terminal, and transmits the command to the navigation device; and upon receipt of the command from the center server, the message transmitter transmits a result of execution of a process associated with the command to the center server, as a message of the chat.

11. The Web bulletin board system according to claim 8, wherein:

the computer readable instructions of the navigation device, when executed by the navigation device processor, further implement a text converter for converting a voice made by a driver into a text and transmitting the text to the message transmitter; and the message transmitter logs in the chat provided by the center server, using an ID of the driver of a vehicle on which the navigation device is mounted, separately from the ID of the navigation device, and transmits the text data received from the text converter to the center server, as a message of the chat.

12. A travel planning assist method in a Web bulletin board system comprising a navigation device, multiple user terminals, and a center server for communicating with the navigation device and the multiple user terminals via a communication network, wherein:

the center server executes:

a positional information updating step for updating information indicating a current position of the navigation device stored in a positional information storage, to information being received indicating the current position of the navigation device, upon receipt from the navigation device, of the information indicating the current position thereof;

a chat service step for managing an ID of a user logging in a chat, and upon receipt of a message from a user terminal used by the user logging in the chat, transmitting the message being received to all user terminals of all users logging in the chat:

a symbol processing step for extracting, from a map database, the positional information of a point as at least one second destination point associated with a character string specified by a symbol, when the symbol representing the second destination point exists in the message received from the user terminal in the chat service step, the map database storing the positional information of the point in association with the character string indicating the point; and a destination point information updating step for additionally storing in a destination point information storage for storing positional information of at least one first destination point, together with an associated character string, the character string and the positional information of the second destination point extracted in the symbol processing step, sorting the character strings relating to the first and second destination points in the destination point information storage in ascending order of distance of the associated positional information from the current position of the navigation device, and transmitting to the user terminal of the user logging in the chat, the character strings being sorted, respectively in association with numbers in ascending order of distance from the current position of the navigation device;

the user terminal executes:

a chat client step for transmitting to the center server, a message inputted according to a manipulation by the user, and displaying the message transmitted from the center server; and a destination point information display step for displaying the character strings transmitted from the center server, being sorted in ascending order of distance from the current position of the navigation device; and the navigation device executes:

a current position calculating step for calculating the current position of the navigation device and a current position transmitting step for transmitting to the center server, the current position calculated in the current position calculating step at a predetermined timing.

13. A center server for communicating with a navigation device and multiple user terminals via a communication network, the center server comprising:

a positional information storage for storing information indicating a current position of the navigation device;

a symbol information storage for storing at least one symbol representing at least one destination point;

a map database for storing positional information of a plurality of points in association with a plurality of character strings, each character string indicating the respective point;

a destination point information storage for storing positional information of at least one first destination point, together with the associated character string;

a center server processor; and a center server memory storing computer readable instructions that, when executed by the center server processor, implement:

a positional information updater for updating the information in the positional information storage, to information indicating the current position of the navigation device being received, upon receipt from the navigation device, of the information indicating the current position thereof;

a chat service part for managing an ID of a user logging in a chat, and upon receipt of a message from a user terminal used by the user logging in the chat, transmitting the message being received to all user terminals of all users logging in the chat;

a symbol processor for extracting, from the map database, the positional information of a point as at least one second destination point associated with the character string specified by the symbol, when the symbol representing the second destination point exists in the message that the chat service part received from the user terminal; and a destination point information updater for additionally storing in the destination point information storage, the character string and the positional information of the second destination point extracted by the symbol processor, sorting the character strings relating to the first and second destination points in the destination point information storage in ascending order of distance of the associated positional information from the current position of the navigation device, and transmitting to the user terminal of the user logging in the chat, the character strings being sorted, respectively in association with numbers in ascending order of distance from the current position of the navigation device.

* * * * *